United States Patent [19]

Pickles

[11] Patent Number: 5,582,461
[45] Date of Patent: *Dec. 10, 1996

[54] INFINITELY ADJUSTABLE LINEAR ACTUATOR

[75] Inventor: Joseph Pickles, Troy, Mich.

[73] Assignee: ITT Automotive, Inc., Auburn Hills, Mich.

[*] Notice: The term of this patent shall not extend beyond the expiration date of Pat. No. 5,556,165.

[21] Appl. No.: 275,981

[22] Filed: Jul. 15, 1994

Related U.S. Application Data

[63] Continuation-in-part of Ser. No. 262,044, Jun. 17, 1994.

[51] Int. Cl.$^6$ ................................................. B60N 2/22
[52] U.S. Cl. ........................... 297/362.14; 74/89.15
[58] Field of Search .................... 297/342, 361.1, 297/362.12, 362.14, 363, 364, 378.12; 74/89.15; 248/429, 430

[56] References Cited

U.S. PATENT DOCUMENTS

| | | | |
|---|---|---|---|
| 2,018,825 | 10/1935 | Wood . | |
| 2,018,828 | 10/1935 | Bell . | |
| 2,596,760 | 5/1952 | Bryant . | |
| 3,127,788 | 4/1964 | Martens | 74/586 |
| 3,339,975 | 9/1967 | Posh | 297/361 |
| 3,350,135 | 10/1967 | Martens | 297/355 |
| 3,356,411 | 12/1967 | Homier et al. | 297/355 |
| 3,369,841 | 2/1968 | Heyl, Jr. | 297/361 |
| 3,383,135 | 5/1968 | Posh | 297/355 |
| 3,398,986 | 9/1968 | Homier | 297/355 |
| 3,774,964 | 11/1973 | Turner . | |
| 4,223,946 | 9/1980 | Kluting | 297/363 |
| 4,291,914 | 9/1981 | Mizelle | 297/361 |
| 4,387,926 | 6/1983 | Van Eerden et al. | 297/375 |
| 4,408,799 | 10/1983 | Bowman | 297/361 |
| 4,579,386 | 4/1986 | Rupp et al. | 297/355 |
| 4,589,301 | 5/1986 | Griner | 74/586 |
| 4,592,591 | 6/1986 | Wiers | 297/375 |
| 4,630,866 | 12/1986 | McFarlane | 297/361 |
| 4,669,781 | 6/1987 | Conroy et al. | 297/355 |
| 4,685,734 | 9/1987 | Brandoli | 297/355 |
| 4,759,587 | 7/1988 | Bucka | 297/361 |
| 4,770,465 | 9/1988 | Wiers | 297/375 |
| 4,782,715 | 11/1988 | Chevance | 74/424.8 R |
| 4,799,734 | 1/1989 | Périou | 297/361 |
| 4,824,172 | 4/1989 | Rees | 297/361 |
| 4,881,775 | 11/1989 | Rees | 297/361 |
| 4,893,704 | 1/1990 | Fry et al. | 74/89.15 X |
| 5,052,752 | 10/1991 | Robinson | 297/361 |
| 5,222,710 | 6/1993 | White et al. | 248/422 |
| 5,280,999 | 1/1994 | Jones et al. | 297/361.1 |
| 5,299,853 | 4/1994 | Griswold et al. | 297/362.12 |
| 5,306,073 | 4/1994 | Rees | 297/362.14 |
| 5,320,413 | 6/1994 | Griswold et al. | 297/362.12 |

FOREIGN PATENT DOCUMENTS

| | | |
|---|---|---|
| 0493198 | 7/1992 | European Pat. Off. . |
| 2633990 | 1/1990 | France . |
| 2044341 | 10/1980 | United Kingdom . |

*Primary Examiner*—Peter R. Brown
*Attorney, Agent, or Firm*—Robert P. Seitter; J. Gordon Lewis

[57] ABSTRACT

A infinitely adjustable linear actuator adjusts the position of two relatively movable components of a vehicle seat. The linear actuator includes a rotatable element fixedly mounted about a threaded shaft. First and second moving members are mounted within a housing and are disposed on opposite sides of an annular collar formed on the rotatable element. The moving members are movable between a first position in which the moving members disengage the rotatable element from bearing surfaces at opposite ends of the housing to form a high rotational resistance connection which prevents rotation of the rotatable element and the interconnected threaded shaft, and a second position in which the moving members are spaced from the rotatable element to enable the rotatable element to move axially into low resistance engagement with bearings in the housing which enables free rotation of the rotatable element and the threaded shaft. Pairs of angularly extending ramp surfaces formed on each moving member slide within angled guide slots formed in the housing to guide the moving members between first and second positions with respect to the annular collar.

40 Claims, 11 Drawing Sheets

INFINITELY ADJUSTABLE LINEAR ACTUATOR

CROSS REFERENCE TO CO-PENDING APPLICATION

This application is a continuation-in-part of co-pending application Ser. No. 08/262,044, filed Jun. 17, 1994, in the name of Joseph Pickles, and entitled INFINITELY ADJUSTABLE LINEAR ACTUATOR FOR VEHICLE SEAT.

BACKGROUND OF THE INVENTION

1. Field of the Invention

The present invention relates, in general, to linear actuators and, more specifically, for linear actuators for positioning vehicle seat components.

2. Description of the Art

Vehicle seat assemblies are usually provided with a seat adjuster for adjusting the horizontal fore and aft position of an upper track movably mounted in a lower track fixed to the vehicle and, in some cases, with a seat recliner for adjusting the angular position of a pivotal seat back with respect to a seat track assembly mounted on the vehicle floor. One type of seat adjuster includes a plurality of discrete, spaced positions or detents for releasibly locking the upper track to the lower track.

Another type of seat adjuster which is also usable as a seat recliner utilizes a linear actuator formed of a threadingly engaged lead screw and nut to provide an infinite number of user selectible seat adjustment positions. Various means are utilized to releasibly lock the nut in a fixed position to prevent rotation of the nut and the lead screw so as to fix one of the movable components of the seat in a user selected, adjusted position with respect to other components of the vehicle seat. While the latter described type of linear actuator is capable of providing infinite seat adjustment positions, such a linear actuator still lacks a reliable, smooth release operation, particularly when seat adjustment is made under load, i.e. the user's weight on the seat.

Further, vehicle seat assemblies are either a power driven or a manually operated type. Due to the different functional requirements of a power driven and a manually operated seat adjuster and/or seat recliner, particularly with respect to the common use of spaced detents engaged by a manually operated locking bar in a manually operated seat adjuster, different track assemblies are necessary for each power driven or manually operated seat adjuster and/or seat recliner. This has resulted in a proliferation of different types of seat assemblies which detracts from the advantages attainable by commonality of components for all power driven or manually operated vehicle seat assemblies.

Thus, it would be desirable to provide a linear actuator for a vehicle seat which provides a smooth, reliable lock and lock release. It would also be desirable to provide such a linear actuator for a vehicle seat which provides an infinite number of seat adjustment positions. It would also be desirable to provide a linear actuator for a vehicle seat which enables a common seat assembly design, including the seat tracks and a major portion of the drive mechanism, regardless of whether the seat assembly is power driven or manually operated. Finally, it would be desirable to provide a linear actuator for a vehicle seat which has a simplified construction, reliable operation, a small overall size and minimal weight.

SUMMARY OF THE INVENTION

The present invention is a linear actuator which is ideally suited for controlling the position of two relatively movable components of a vehicle seat.

In one embodiment, the linear actuator includes a threaded shaft which threadingly engages a rotatable element having an internal threaded bore. The rotatable element is disposed within a housing which is mounted to one component of a vehicle seat. Bearing means are mounted in opposite ends of the housing for providing a low resistance rotational surface for opposite ends of the rotatable element. The bearing means and the rotatable element are disposed in a predetermined dimensional relationship which enables the rotatable element, when the linear actuator is in the unlocked position, to move axially a short distance with the shaft under axial loads imposed in one direction on the shaft to bring the rotatable element into low resistance rotational engagement with one of the bearing means to enable rotation of the rotatable element under such axial loads on the shaft. A rotatable element displacing means is mounted on the housing for displacing the rotatable element from a low rotational resistance engagement with one of the bearing means to a position in which the rotatable element is disengaged from both of the bearing means. When the displacing means is in the rotatable element disengaging position, the displacing means, the rotatable element and the threaded shaft form a high rotational resistance connection which prevents rotation of the rotatable element and thereby prevents movement of the shaft threadingly engaged with the rotatable element.

In a preferred embodiment, an enlarged annular collar is formed on the rotatable element. The lock means or members are disposed adjacent to and engage the collar to displace the rotatable element to the non-rotatable position.

Preferably, the displacing means includes first and second moving members and moving means, mounted in the housing, for moving the first and second moving members into and out of engagement with the rotatable element.

The moving means preferably comprises drive means including a drive pin rotatably mounted in the housing. A release lever is attached to the drive pin and bidirectionally rotates the drive pin upon bidirectional pivotal movement of the release lever. A pair of drive fingers are mounted on the drive pin and alternately engage the first and second moving members upon bidirectional rotation of the drive pin to move the first and second moving members into and out of engagement with the rotatable element depending upon the direction of pivotal movement of the release lever.

The linear actuator also includes guide means formed on the moving members and the housing for guiding the movement of the moving members between first and second positions in and out of engagement with the rotatable element. Preferably, the guide means comprises at least one pair of tabs mounted on and extending outward from each of the moving members, with the tabs slidingly extending through guide slots formed in a side wall portion of the housing. Both the tabs and the guide slots are angularly disposed with respect to the plane of the annular collar on the rotatable element to move the moving members toward and away from the rotatable element.

In a preferred embodiment, each moving member includes two pairs of tabs which extend through spaced guide slots in the housing. The pairs of tabs on the first moving member and the corresponding guide slots in the housing are angularly disposed at identical angles with respect to the plane of the moving member. However, the tabs on the first moving member extend at oppositely directed angles from the pairs of tabs on the second moving member.

Further, the first and second moving members are interconnected for simultaneous movement by the moving means into and out of engagement with the rotatable element.

The infinitely adjustable linear actuator of the present invention may be employed in a horizontal position on a vehicle seat assembly, with the housing attached to one track of a vehicle track assembly and one end of the threaded shaft attached to a pivotal seat back pivot link to act as a seat back recliner.

Alternately, the linear actuator may be mounted in a substantially vertical position on a vehicle seat assembly with one end of the threaded shaft pivotally connected to the seat track assembly and the housing of the linear actuator mounted on the seat back frame to again enable the linear actuator to serve as a seat back recliner.

Further, the linear actuator may be mounted to a vehicle seat assembly with the threaded shaft fixedly mounted to the lower seat track. The housing surrounding the rotatable element is attached to the movable upper track such that when the moving members are in the disengaged position, axial forces imposed on the upper track cause rotation of the rotatable element to enable horizontal fore and aft translation of the upper track with respect to the fixed lower track.

In another embodiment, the linear actuator includes a rotatable shaft which extends through a housing. A rotatable element is disposed in the housing and fixedly coupled about the shaft. Bearing means are mounted in opposite ends of the housing for providing a low resistance rotational surface for opposite ends of the rotatable element. The bearing means and the rotatable element are disposed in a predetermined dimensional relationship which enables the rotatable element and the shaft, when the linear actuator is in the unlocked position, to move axially a short distance under axial loads imposed in one direction on the shaft to bring the rotatable element into low resistance rotational engagement with one of the bearing means to enable rotation of the rotatable element and the shaft under such axial loads on the shaft.

Means are also mounted in the housing for displacing the rotatable element from engagement with one of the bearing means to a non-rotatable position in which the rotatable element is disengaged from both of the bearing means. The displacing means, when engaging the rotatable element, forms a high resistance connection to rotation which prevents rotation of the rotatable element and the shaft.

Preferably, the displacing means comprises first and second moving members which are each movable from a first engaged position with the rotatable element in which the first and second moving members disengage the rotatable element from both of the bearing means and a second disengaged position spaced from the rotatable element. Means are also mounted in the housing and coupled to the first and second moving members for moving the first and second moving members between the first and second positions.

The moving means also includes a drive means including a drive pin rotatably mounted in the housing. A release lever is attached to the drive pin and bidirectionally rotates the drive pin upon bidirectional pivotal movement of the release lever. A pair of drive fingers are mounted on the drive pin and alternately engage and move the first and second moving members, which are interconnected for simultaneous movement, upon bidirectional rotation of the drive pin.

The linear actuator in this embodiment also includes guide means for guiding the movement of the first and second moving members between the first and second positions into an out of engagement with the rotatable element. Preferably, the guide means comprises guide slots formed in opposites sides of the housing and disposed at a non-perpendicular angle with respect to the longitudinal axis of the housing. Ramp surfaces are formed on each of the first and second moving members and slidably engage one of the guide slots for guiding the first and second moving members into and out of engagement with the rotatable element upon bidirectional rotation of the drive pin and the release lever.

In this embodiment, the rotatable element is in the form of a body fixedly mounted on the shaft. An enlarged, radially outwardly extending collar is formed intermediately on the body and has opposed side surfaces which are engaged by the first and second moving members when the first and second moving members are moved to the first, locking position.

In this latter embodiment of the present linear actuator employed in a seat adjuster, a threaded drive nut is mountable on the shaft which is formed with complimentary threads, such that rotation of the shaft when the moving members are disengaged from the rotatable element, results in translation of the drive nut along the shaft. A linkage connected between the drive nut and a seat back provides adjustment in the angular position of the seat back with respect to the seat bottom or seat track assemblies.

In a seat adjuster application, a drive nut is threadingly mounted on the shaft, with the drive nut fixedly connected to the upper seat track. The rotatable shaft is in turn rotatably mounted to the lower track such that rotation of the shaft causes translation of the drive nut along the shaft and relative movement of the upper track with respect to the lower track which is fixedly mounted to the vehicle.

The infinitely adjustable linear actuator of the present invention, besides providing an infinite number of user selectible positions between two relatively movable components of a vehicle seat, also provides the infinitely adjustable positions with a simple, lightweight small package size. Further, the linear actuator of the present invention provides a smooth, low force release from the locked position and also prevents chucking or undesirable movement of the seat back with respect to the seat bottom when the linear actuator is in the fully engaged or locked position. In the embodiment in which the rotatable element is fixedly coupled to the shaft, the linear actuator of the present invention may be universally used on any vehicle seat assembly, regardless of whether the vehicle seat assembly is power driven or manually operated. This provides commonality of components in various vehicle seat assemblies and the cost advantages resulting therefrom since seat track assemblies designed specifically for a power driven seat adjuster or a manually driven seat adjuster can be replaced by a single seat track assembly usable in both power driven and manually operated seat adjusters. Finally, the linear actuator is constructed to provide a high resistive force to rotation of the rotatable element, which resistive force proportionally increases with increased force applied to the threaded shaft.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
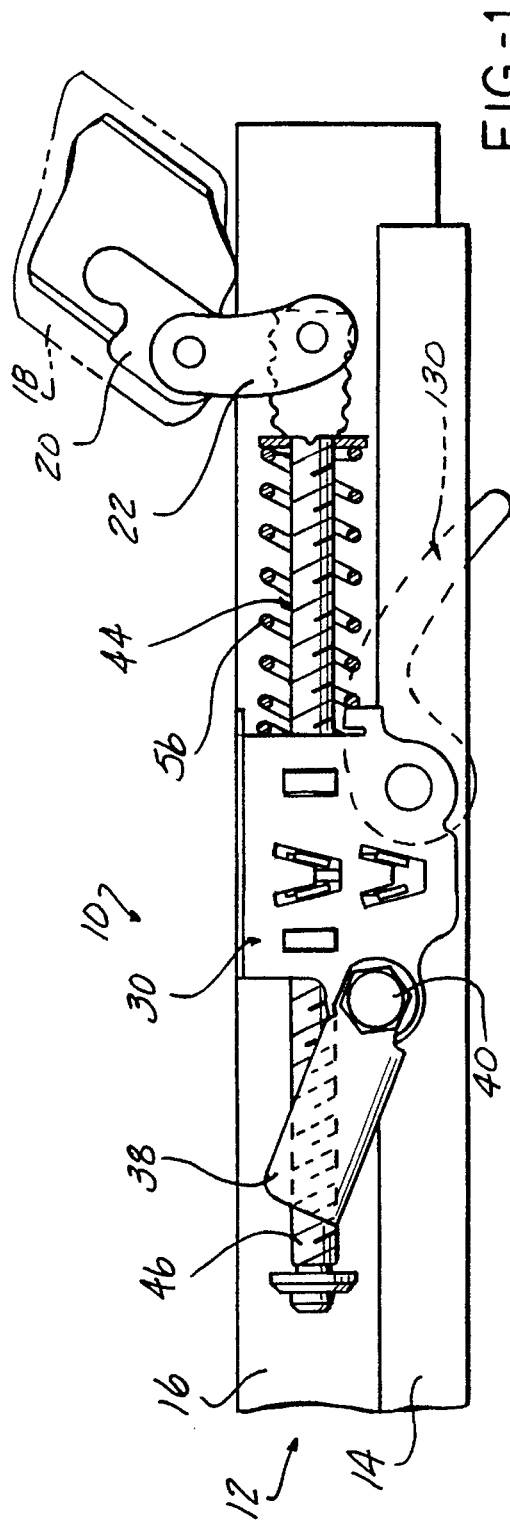
FIG 1 is a side elevational view of a first embodiment of la linear actuator constructed in accordance with the teachings of the present invention mounted for use as a seat recliner.

Referring now to the drawing, and to FIGS. 1–7 in particular, there is depicted a first embodiment of an infinitely adjustable linear actuator 10 constructed in accordance of the teachings of the present invention and employed as a vehicle seat recliner actuator.

As is conventional, a vehicle seat includes opposed track assemblies 12, only one of which is shown in FIG. 1. Each track assembly 12 includes a lower track or rail 14 which is fixedly mounted to a vehicle floor. An upper track 16 is slidably mounted within the lower track 14 and is horizontally movable fore and aft with respect to the lower track 14.

A seat back 18 is pivotally mounted to the seat track assembly 12 by means of a pivotal connection between a seat back frame 20 and a seat back pivot link 22. The seat back pivot link 22 is connected at one end to the seat back frame 20 and at another end to a movable element of the linear actuator 10. Actuation of the linear actuator 10 results in pivotal movement of the seat back 18 with respect to the seat track assembly 12, as described in greater detail hereafter.

It will be understood that in certain seat applications, two linear actuators may be employed, with each linear actuator mounted on one of the two seat track assemblies. In such an application, the two linear actuators may be interconnected for simultaneous movement or may be completely independent of each other.

Figure 2:
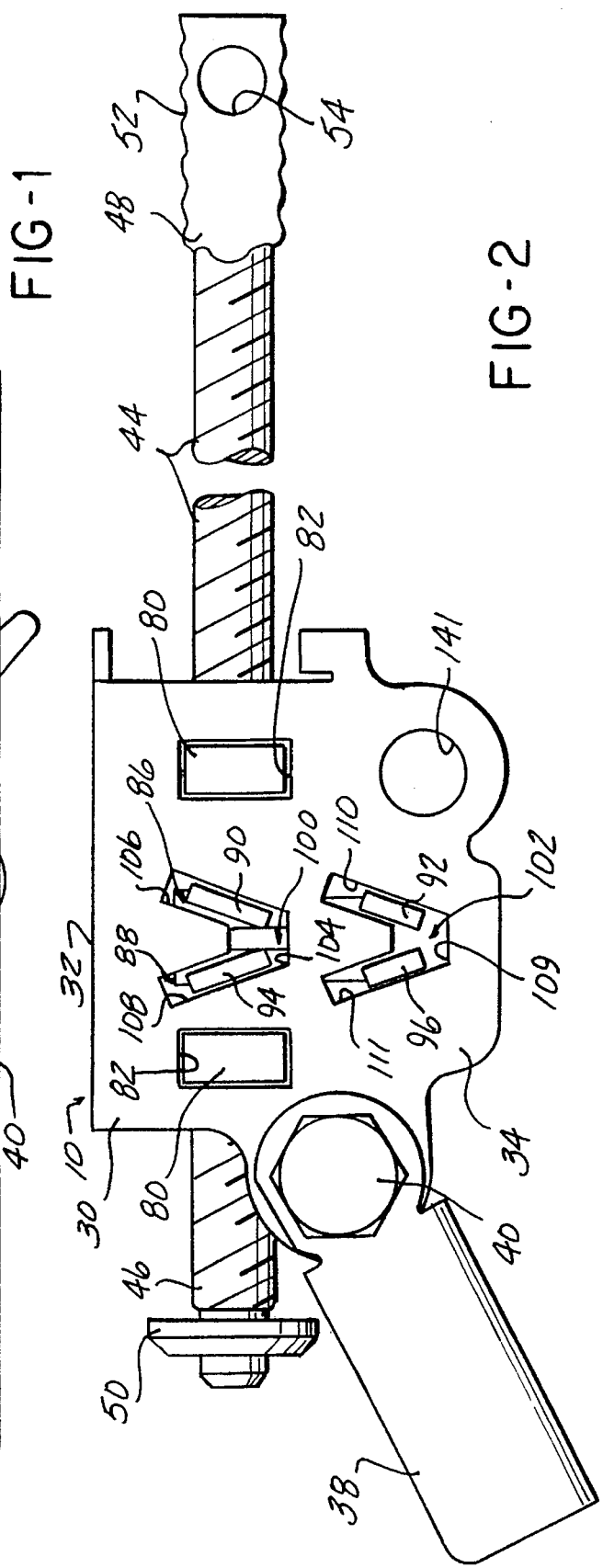
FIG. 2 is an enlarged, side elevational view of the linear actuator shown in FIG. 1.
Figure 3:
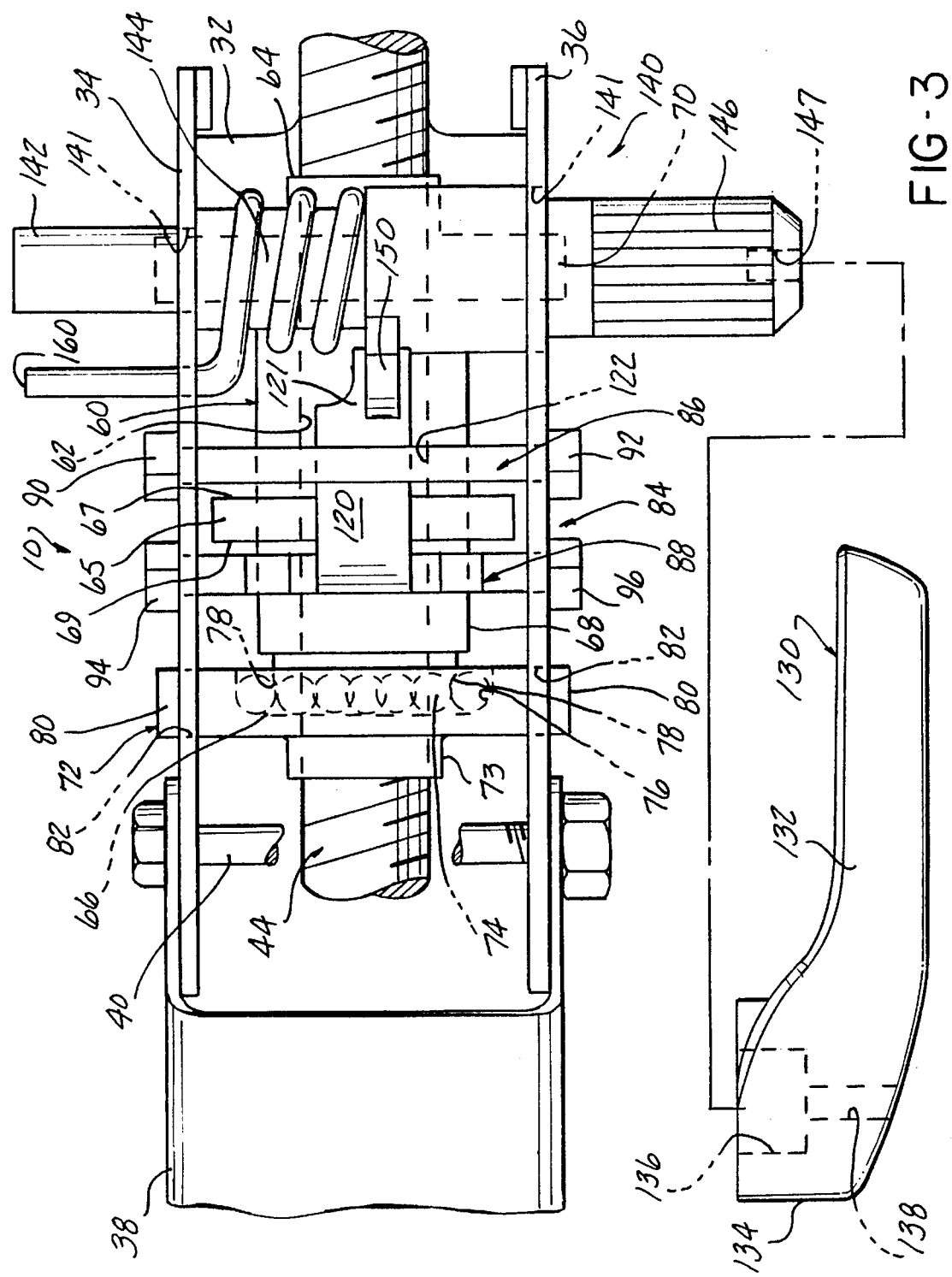
FIG. 3 a partially exploded, bottom elevational view of the linear actuator shown in FIG. 2.
Figure 4:
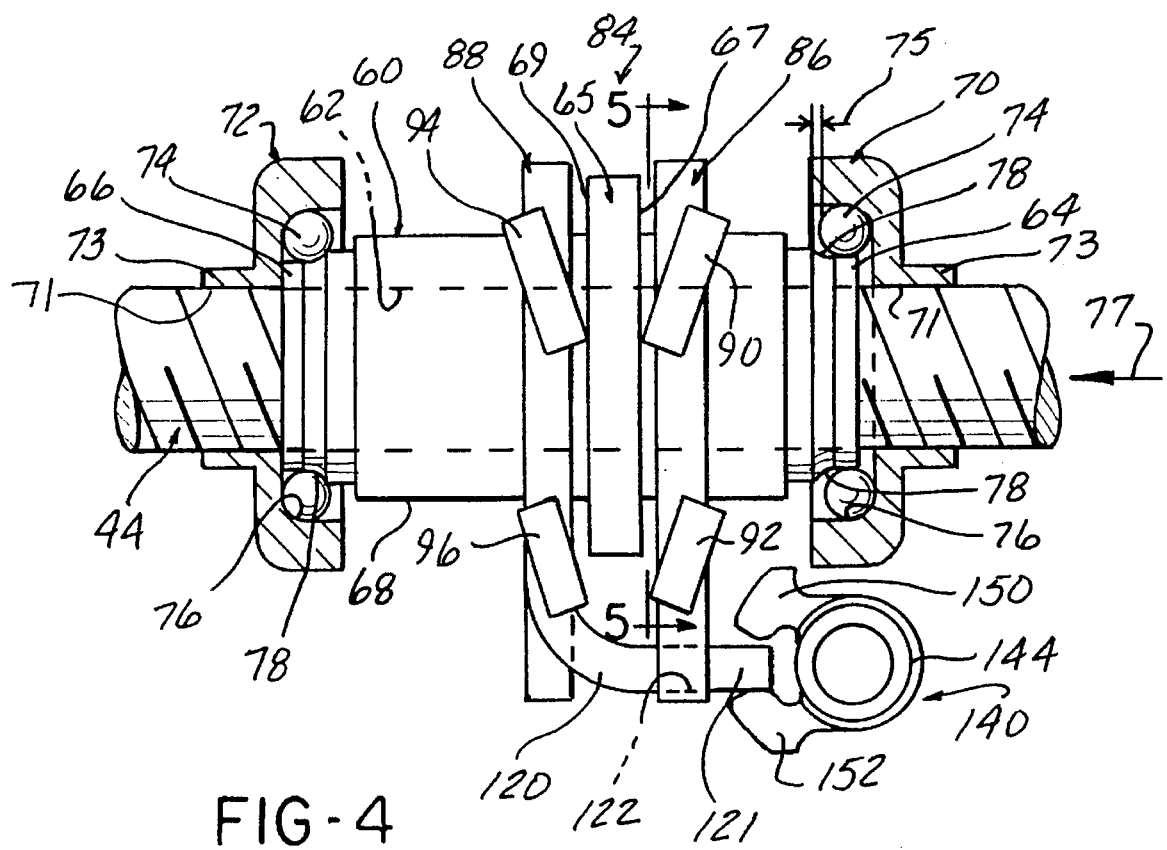
FIG. 4 is a side elevational view of the linear actuator shown in an unlocked position with a portion of the housing removed.

A more detailed view of the linear actuator 10 is shown in FIGS. 2, 3 and 4. The linear actuator 10 includes a housing 30 which may take any suitable form. Preferably, the housing 30 is formed of a single formed member, but may optionally be formed of two or more interconnected or joined members. By example only, the housing 30 has a generally U-shape including a top wall 32 and opposed side walls 34 and 36 which extend from the top wall 32. The top wall 32 and the spaced side walls 34 and 36 define an interior chamber in which certain operative elements of the linear actuator 10 are mounted. The housing 30 may be formed of any suitable material, such as a metal or a high strength plastic.

The housing 30 is adapted to be pivotally mounted to the seat track assembly 12 by means of a bracket 38 which is fixedly joined to the upper track 16 by suitable means and which is pivotally connected by a pivot pin 40 to the housing 30. The bracket 38 securely attaches the housing 30 of the linear actuator 10 to the seat track assembly 12, but enables pivotal movement of the housing 30 about the pivot pin 40.

A shaft 44, such as a threaded lead screw, translatingly extends through the housing 30. The shaft 44 has opposed first and second ends 46 and 48. A stop 50 in the form of a washer is mounted on the first end 46 of the shaft 44. The opposite second end 48 of the shaft 44 is formed in a flat end having threads 52 formed on opposed exterior sides thereof. An aperture 54 is formed in the flat, second end 48 of the shaft 44 and receives a fastener for pivotally attaching the second end 48 of the shaft 44 to the seat back pivot link 22, as shown in FIG. 1.

A biasing means, such as a coil spring 56, is disposed about the shaft 44, adjacent the second end 48 thereof. The spring 56 is seated between the flat end 48 of the shaft 44 and one end of the housing 30, as shown in FIG. 1. When the linear actuator 10 is in the disengaged position permitting movement of the seat back 18, the spring 56 provides a normal biasing force between the housing 30 and the second end 48 of the shaft 44 to normally bias the seat back 18 to a generally upright position as shown in FIG. 1.

As shown in FIGS. 3 and 4, a rotatable element 60 is mounted within the housing 30. The rotatable element 60 is preferably in the form of a nut having an internally threaded through bore 62 which extends between opposed first and second ends 64 and 66. The rotatable element or nut 60 also has a solid exterior side wall or surface 68. An engagement member is formed on the rotatable element 60. Preferably, the engagement member is an enlarged diameter annular collar 65 formed on the rotatable element 60 intermediate the first and second ends 64 and 66. The collar 65 has opposed side surfaces 67 and 69 extending radially outward from the side wall 68 of the rotatable element 60.

As shown in FIG. 4, the rotatable element 60 is seated between two bearing means 70 and 72 which are mounted in opposite ends of the housing 30. As shown in FIGS. 2 and 3, each bearing means 70 and 72 is fixedly mounted between the side walls 34 and 36 of the housing 30 by means of tabs 80 which extend outwardly from opposite sides of each bearing means 70 and 72 and which are snugly mounted in apertures 82 in each side wall 34 and 36 of the housing 30.

When the bearing means 70 and 72 are formed of a metallic material, such as steel, bearings 74, generally in the form of a plurality of ball bearings mounted in a bearing race, are mounted in an interior recess 76 in each bearing means 70 and 72 and engage a recessed annular seat 78 formed on each of the first and second ends 64 and 66 of the rotatable element 60.

A through bore 71 extends through each bearing means 70 and 72. In addition, an annular sleeve 73 is formed on the exterior surface of each bearing means 70 and 72 and includes a through bore alignable with the bore 71. The rotatable shaft 44 extends through the bore 71 in the bearing means 70 and 72 as well as through the sleeve 73 thereon.

The bearing means 70 and 72 provide a low resistance or friction surface for rotation of the rotatable element 60 as described hereafter. It will be understood that when the bearing means 70 and 72 are formed of a suitable plastic, the bearings 74 may be eliminated, since the bearing means or members 70 and 72 themselves provide the low resistance surface for the first and second ends 64 and 66 of the rotatable element 60.

According to a preferred embodiment of the present invention, the bearing means 70 and 72, or at least the interior recess or bearing seat surfaces 76 thereof, are disposed in a predetermined dimensional relationship with the seats 78 on the rotatable element 60. This dimensional relationship enables a small amount of axial movement of the rotatable element 60, i.e. approximately 0.020 inches by example only, between the bearing means 70 and 72 when the linear actuator 10 is disengaged from the rotatable element and axial forces are applied to the shaft 44.

The linear actuator 10 also includes rotatable element displacing means 84. The displacing means 84 preferably includes first and second spaced, moving members 86 and 88, each in the form of a planar plate by way of example only. The moving members 86 and 88 are mounted within the housing 30 and are movable between first and second positions, as described hereafter. As shown in FIGS. 2 and 4, the linear actuator 10 also includes guide means for guiding the movement of the first and second moving members 86 and 88 between the first and second positions. The guide means preferably comprises at least one and preferably a plurality of angularly disposed tabs which are formed on each of the moving members 86 and 88. In a preferred embodiment, the first moving member 86 includes a first pair of angularly disposed tabs 90 and a second spaced pair of tabs 92. The pairs of tabs 90 and 92 are mounted on or integrally formed with the planar moving member 86 and are oriented at a predetermined, identical angle with respect to the plane formed by the first moving member 86, as shown in FIG. 4.

The second moving member 88 includes a first pair of tabs 94 and a second pair of tabs 96 spaced from the first pair of tabs 94. The tabs 94 and 96 are also integrally formed on or otherwise mounted on the planar second moving member 88 and are oriented at a predetermined, identical angle from the plane of the second moving member 88.

The first and second moving members 86 and 88 are mounted within the housing 30 on opposite sides of the enlarged annular collar 65 on the rotatable element 60. In this arrangement, the pairs of tabs 90 and 92 on the first moving member 86 are disposed at an acute angle with respect to the plane of the first side surface 67 on the annular collar 65. The pairs of tabs 94 and 96 of the second moving member 88 are also disposed at the same acute angle, but extend in an opposite direction from the second side surface 69 of the annular collar 65 than the tabs 90 and 92, as shown in detail in FIGS. 4 and 6.

As shown in FIG. 2, the guide means also includes suitably formed guide slots, such as the spaced guide slots 100 and 102 which are arranged in aligned pairs on each of the side walls 34 and 36 of the housing 30. The guide slots 100 and 102 are identically formed and are co-linearly aligned on each side wall 34 and 36. The guide slot 100 has a generally V-shape with a base portion 104 and two outward angularly extending side slots 106 and 108. The side slots 106 and 108 slidably receive the first pair of tabs 90 and 94, respectively, on the moving members 86 and 88. The guide slot 102 also has a V-shape with a base portion 109 and side slots 110 and 111 which slidably receive the second pair of tabs 92 and 96, respectively, on the first and second moving members 86 and 88.

Figure 6:
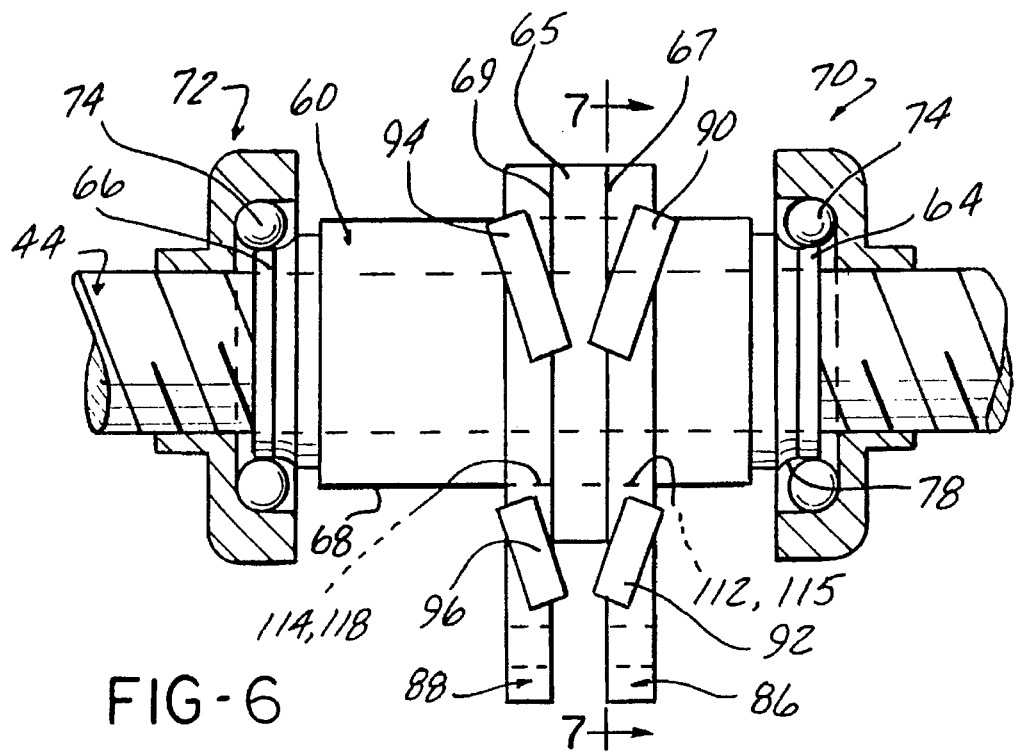
FIG. 6 is a partial, side elevational view, similar to FIG. 4, but showing the linear actuator in a locked position.
Figure 5:
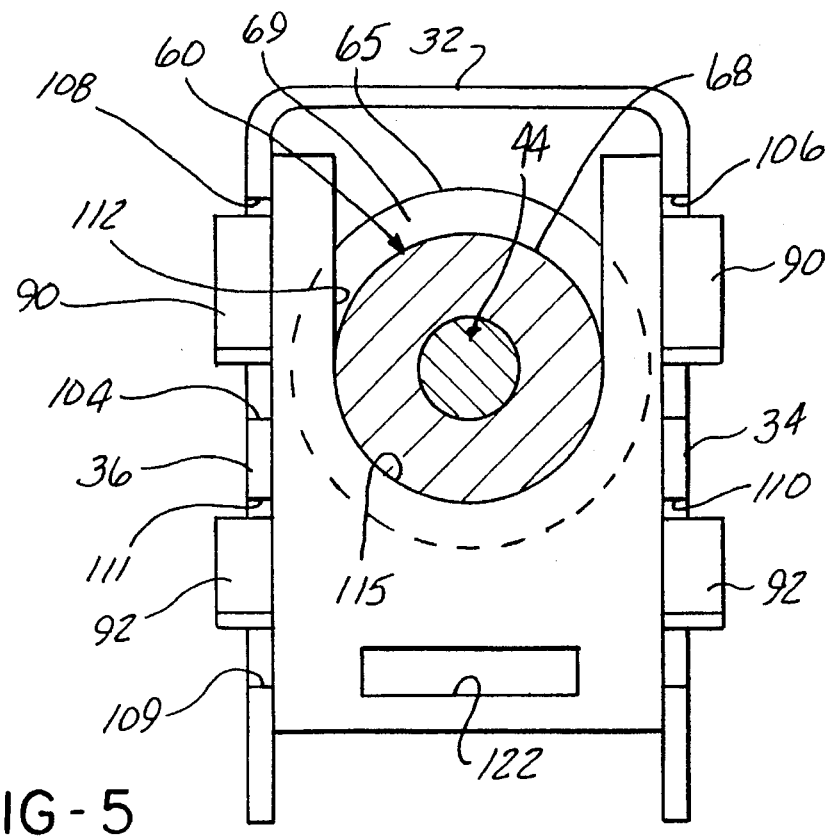
FIG. 5 is a cross sectional view generally taken along line 5—5 in FIG. 4.

An aperture is formed in each of the moving members 86 and 88 for passage of the rotatable element 60 through the moving members 86 and 88. Specifically, an aperture 112 is formed in the first moving member 86 and an aperture 114 is formed in the second moving member 88, as shown in FIGS. 5 and 6. Although the apertures 112 and 114 may have any suitable shape, in a preferred embodiment, the apertures 112 and 114 have a generally U-shape formed by a peripheral edge 115 in the first moving member 86 surrounding the aperture 112 and a peripheral edge 118 surrounding the aperture 114 in the second moving member 88.

Figure 7:
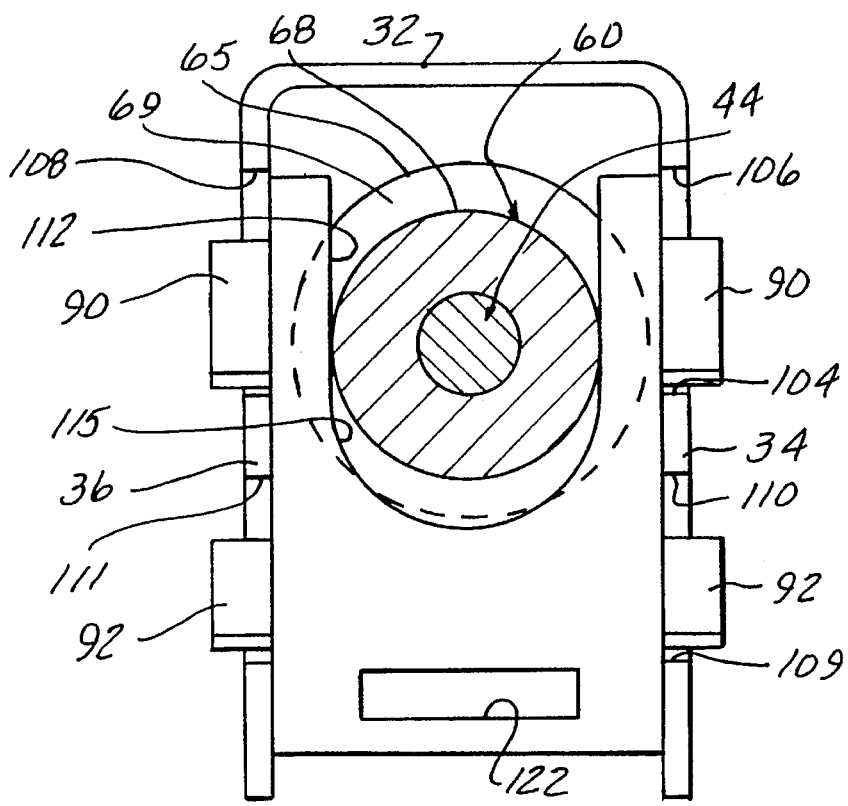
FIG. 7 is a cross sectional view generally taken along line 7—7 in FIG. 6.

The displacing means also includes means for moving the movable members 86 and 88 between a rotatable element disengaged position shown in FIGS. 4 and 5 in which the rotatable element 60 is freely rotatable about the shaft 44 upon axial loading forces imposed on the shaft 44, and an engaged position shown in FIGS. 6 and 7 in which the rotatable element 60 is locked against rotation and thereby prevents corresponding translation or movement of the shaft 44 despite any axial loading forces imposed on the shaft 44.

In order that the first and second moving members 86 and 88 are moved simultaneously between a first engaged position and a second disengaged position, the first and second moving members 86 and 88 are interconnected by means of a leg 120 which is integrally formed on and extends generally perpendicularly from one end of the second moving member 88. The leg 120 has an outer end 121 which is slidably received in and extends through a mating aperture 122 formed in the first moving member 86, as shown in FIGS. 3 and 4.

As shown in FIG. 3, the moving means also includes a release lever 130 having a generally arcuate shaped lever portion 132 and an annular connector end 134. An internal splined bore 136 extends inward through the connector end 134. A smaller fastener receiving bore 138 extends from the bore 136 to the exterior surface of the connector end 134.

A release lever shaft or drive pin 140 is rotatably mounted in apertures the side walls 34 and 36 of the housing 30. The release lever shaft 140 includes a first small diameter end portion 142 which extends through aperture 141 in the side wall 34 of the housing 30. The end portion 142 integrally extends from an enlarged intermediate portion 144. A spline shaft 146 extends from the enlarged portion 144 of the release lever shaft 140 and is disposed exteriorly of the side wall 36 of the housing 30. The splines on the spline shaft 144 mate with the internal splines 136 in the release lever 130 such that pivotal movement of the release lever 130 is transmitted to rotation of the release lever shaft 140.

A fastener, not shown, extends through the bore 138 in the release lever 130 into a bore 147 in the end of the release lever shaft 140 to attach the release lever 130 to the shaft 140.

As shown in FIGS. 3 and 4, a pair of arcuately spaced drive fingers 150 and 152 are integrally formed on the enlarged portion 144 of the release lever shaft 140. The inner ends of the drive fingers 150 and 152 are spaced apart and are disposed on opposite sides of the end 121 of the perpendicular leg 120 extending from the second moving member 88. In this manner, rotation of the release lever 130 between a first position corresponding to a rotatable element engaged position of the linear actuator 10 to a second position corresponding to a rotatable element disengaged position of the linear actuator 10 results in rotation of the release lever shaft 140 to alternately bring the drive finger 152 or the drive finger 150 into contact with the leg 120 of the moving member 88. Depending upon the direction of rotation of the release lever 130 between the first and second positions, engagement of the respective drive fingers 150 and 152 with the leg 120 will cause the interconnected first and second moving members 86 and 88 to move from the unlocked position shown in FIGS. 4 and 5 to the locked position shown in FIGS. 6 and 7.

A biasing spring, such as a coil spring 160, is connected at one end to the side wall 34 of the housing 30 and at another end to the release lever shaft 140 for normally biasing the release lever shaft 140 and the release lever 130 to the first position corresponding to a locked position of the linear actuator 10.

In operation, the linear actuator 10 of the present invention will normally assume a rotatable element engaged position as shown in FIGS. 1, 6 and 7 due to the biasing spring 160 which normally biases the release lever 130 to the first position. In this position, the pairs of tabs 90, 92, 94 and 96 on the first and second moving members 86 and 88 are disposed at the lower ends of the side slots 106, 108, 110 and 111 in each side wall 34 and 36 of the housing 30. Further, the moving members 86 and 88 are in engagement with the side surfaces 67 and 69 of the annular collar 65 on the rotatable element 60. This engagement between the first and second moving members 86 and 88 and the annular collar 65 on the rotatable element 60 disengages the rotatable element 60 from both bearing means 70 and 72. This disengagement coupled with the frictional forces between the threads of the rotatable element 60 and the shaft 44 and the frictional forces between the moving members 86 and 88 and the collar 65 on the rotatable element 60 create a high resistance to rotation of the rotatable element 60. Since the rotatable element 60 is thus locked against rotation, movement of the shaft 44 and pivotal movement of the seat back 18 with respect to the seat track assembly 12 is also prevented. In addition, the secure locking of the rotatable element 60 and the shaft 44 minimizes any chucking or movement of the seat back 18 due to vehicle vibration.

When it is desired to adjust the angular position of the seat back 18 with respect to the seat track assembly 12, the release lever 130 is pivoted to the second unlocked position. This pivotal movement of the release lever 130 causes rotation of the release lever shaft 140 and brings the drive finger 152 into engagement with the end 121 of the leg 120 of the second moving member 88 and causes movement of the second moving member 88 and the interconnected first moving member 86 from the engaged position shown in FIGS. 6 and 7 to disengaged position shown in FIGS. 4 and 5. During this sliding movement of the moving members 86 and 88, the tabs 90, 92, 94 and 96 on the first and second moving members 86 and 88 slide away from the bottom portions 104 and 109 of the guide slots 100 and 102 and along the side slots 106, 108, 110 and 111 to axially displace the moving members 86 and 88 away from engagement with the annular collar 65, as shown in FIG. 4. With the moving members 86 and 88 disengaged from the rotatable element 60, the rotatable element 60 is free to move axially a slight distance as shown by reference number 75 in FIG. 4 into engagement with one of the bearing means 70 or 72 depending on the direction of axially loading on the shaft 44. For example, if an axial load is imposed on the shaft 44 in the direction of arrow 77 in FIG. 4, such as by a pivoting force applied to the seat back 18, the shaft 44 and the rotatable element 60 will move axially to the left to bring the bearing seat 78 on the second end 66 of the rotatable element 60 into engagement with the bearing means 72. This engagement provides a low rotation resistance which enables the rotatable element 60 to freely rotate under the axial loading forces applied to the rotatable shaft 44. As a result, since the rotatable element 60 is free to rotate, such axial loading forces result in translation of the shaft 44 which enables pivotal movement of the pivot link 22 and thereby pivotal movement of the seat back frame 20 and seat back 18. When the seat back 18 is in the desired angular position with respect to the seat track assembly 12, the release lever 130 is released which, through the biasing spring 160, causes the release lever shaft 140 to rotate in an opposite direction thereby bringing the drive finger 150 into engagement with the end 121 of the leg 122 of the moving member 88 and causes a resulting sliding movement of the interconnected moving members 86 and 88 back to the engaged position shown in FIGS. 6 and 7.

When an axial load is applied to the shaft 44 in a direction opposite to arrow 77, the shaft 44 and the rotatable element 60 will axially move a small distance 75 to the right as viewed in FIG. 4 to bring the bearing seat 78 on the first end 64 of the rotatable element 60 into engagement with the bearing means 70 to again allow rotation of the rotatable element 60.

It will be further understood that when the linear actuator 10 is in the locked position shown in FIGS. 6 and 7, any axial loading forces imposed upon the seat back 18 which are transmitted through the seat back frame 20 and the pivot link 22 to the shaft 44 are grounded through the threaded connection between the shaft 44 and the nut 60 and, also, from the nut 60 through the moving means 86 and 88 and the outwardly extending tabs 90, 92, 94 and 96 to the housing 30 which is securely mounted on the seat track assembly 12.

Figure 8:
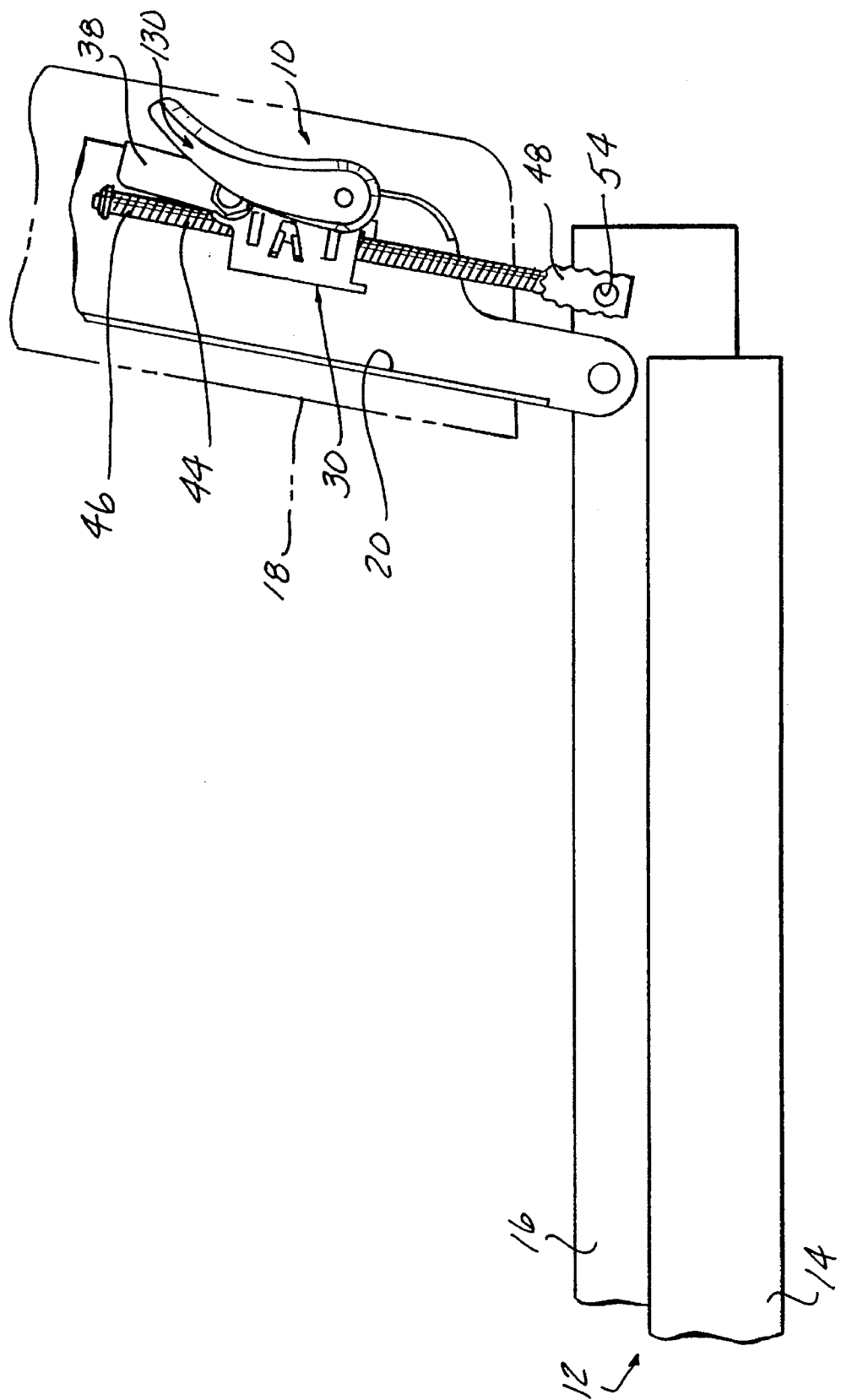
FIG. 8 is a side elevational view of the first embodiment of the linear actuator mounted for use as a vertical seat recliner.

The linear actuator 10 of the present invention may also be employed as a vertical seat recliner as shown in FIG. 8. In this embodiment, the linear actuator 10 is disposed within the seat back frame 20 and pivotally connected thereto by means of the bracket 38. Further, the second end 48 of the shaft 44 is pivotally connected to one end of the upper track or rail 16 by means of a suitable fastener extending through the aperture 54 in the second end 48 of the shaft 44.

The operation of the linear actuator 10 in the vertical seat recliner embodiment shown in FIG. 8 is substantially identical to that described above and shown in FIGS. 1–7 in that when the moving members 86 and 88 of the linear actuator 10 are engaged with the rotatable element 60, the rotatable element 60 is prevented from rotation which thereby prevents any pivotal movement of the shaft 44 about the pivot pin extending through the aperture 54 in the second end of the shaft 44. However, when the release lever 30 is pivoted to the unlocked position, as described above, the rotatable element is free to rotate and, in this embodiment, traverses the shaft 44. This enables pivotal adjustment of the angular position of the seat back 18 with respect to the seat track assembly 12 to any user desired position. When the selected recliner position is reached, the release lever 30 is released and automatically returns to the locked position to prevent further movement of the seat back with respect to the seat track assembly 12.

Figure 9:
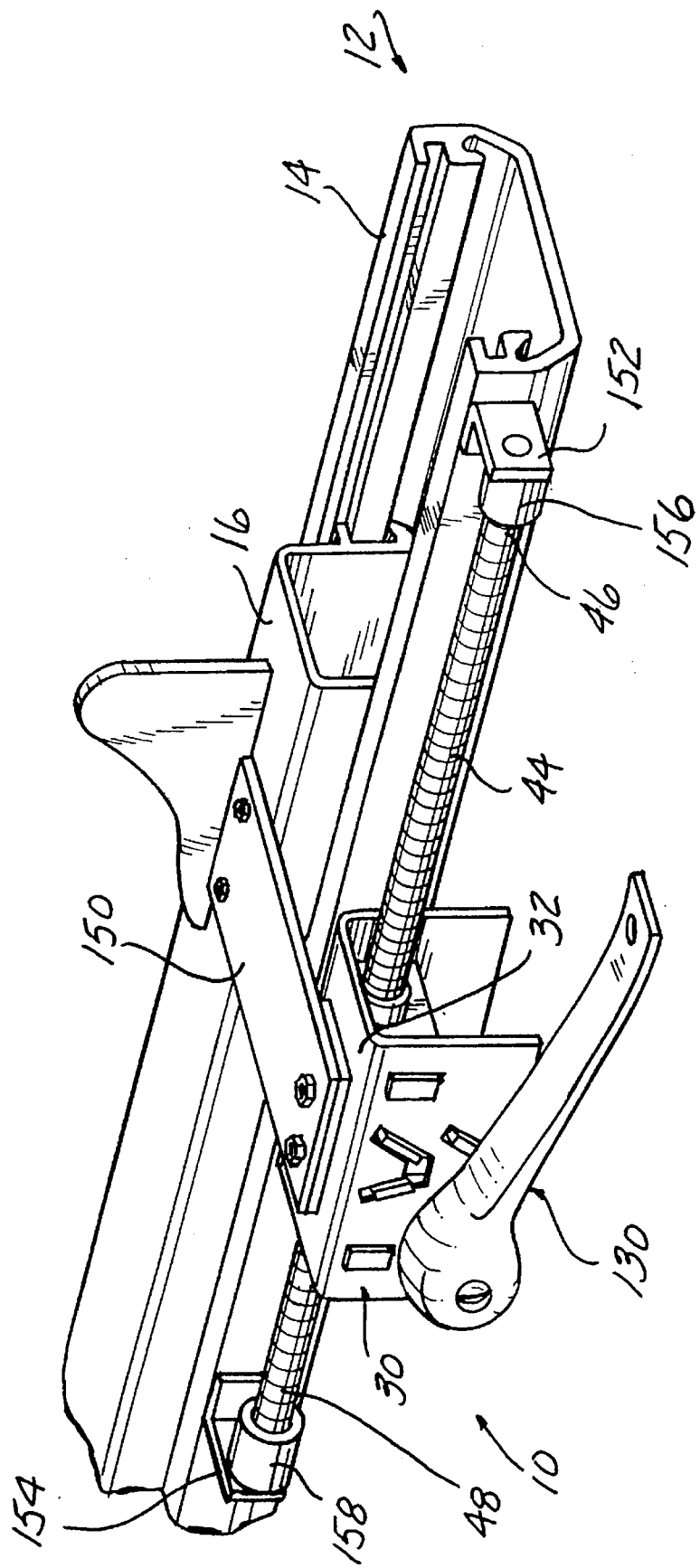
FIG. 9 is a perspective view showing the first embodiment of the linear actuator mounted for use as a vehicle seat adjuster.

As shown in FIG. 9, the linear actuator 10 of the present invention may also be mounted for use as a horizontal, fore and aft seat adjuster. In this embodiment, the housing 30 of the linear actuator 10 is fixedly mounted to the upper seat track 16 by means of a suitably formed bracket 150 which is fixedly joined to the upper track 16 and to the top wall 32 of the housing 30.

Further, the shaft 44 is fixedly and non-rotatably mounted to the lower track 14 by means of brackets 152 and 154 which are spaced apart and fixedly mounted to the lower track 14. Collars 156 and 158 are mounted on each bracket 152 and 154, respectively, and fixedly receive the first and second ends 46 and 48, respectively, of the shaft 44.

The operation of the linear actuator 10 shown in FIG. 9 is the same as that described in the previous two embodiments in that when the release lever 130 is in the locked position, the rotatable element 60 in the linear actuator 10 is prevented from rotation and longitudinal movement along the shaft 44 despite any fore and aft forces exerted on the upper track 16 of the seat track assembly 12. However, when the release lever 130 is pivoted to the unlocked position, the rotatable element 60 in the linear actuator 10 is free to rotate and traverse along the shaft 44. This in turn allows the user to manually adjust the horizontal fore and aft position of the upper track 16 with respect to the lower track 14 by exerting horizontal fore or aft forces on the upper track 16. Such axial forces result in movement of the upper track 16 through rotation of the rotatable element 60 about the shaft 44.

Figure 10:
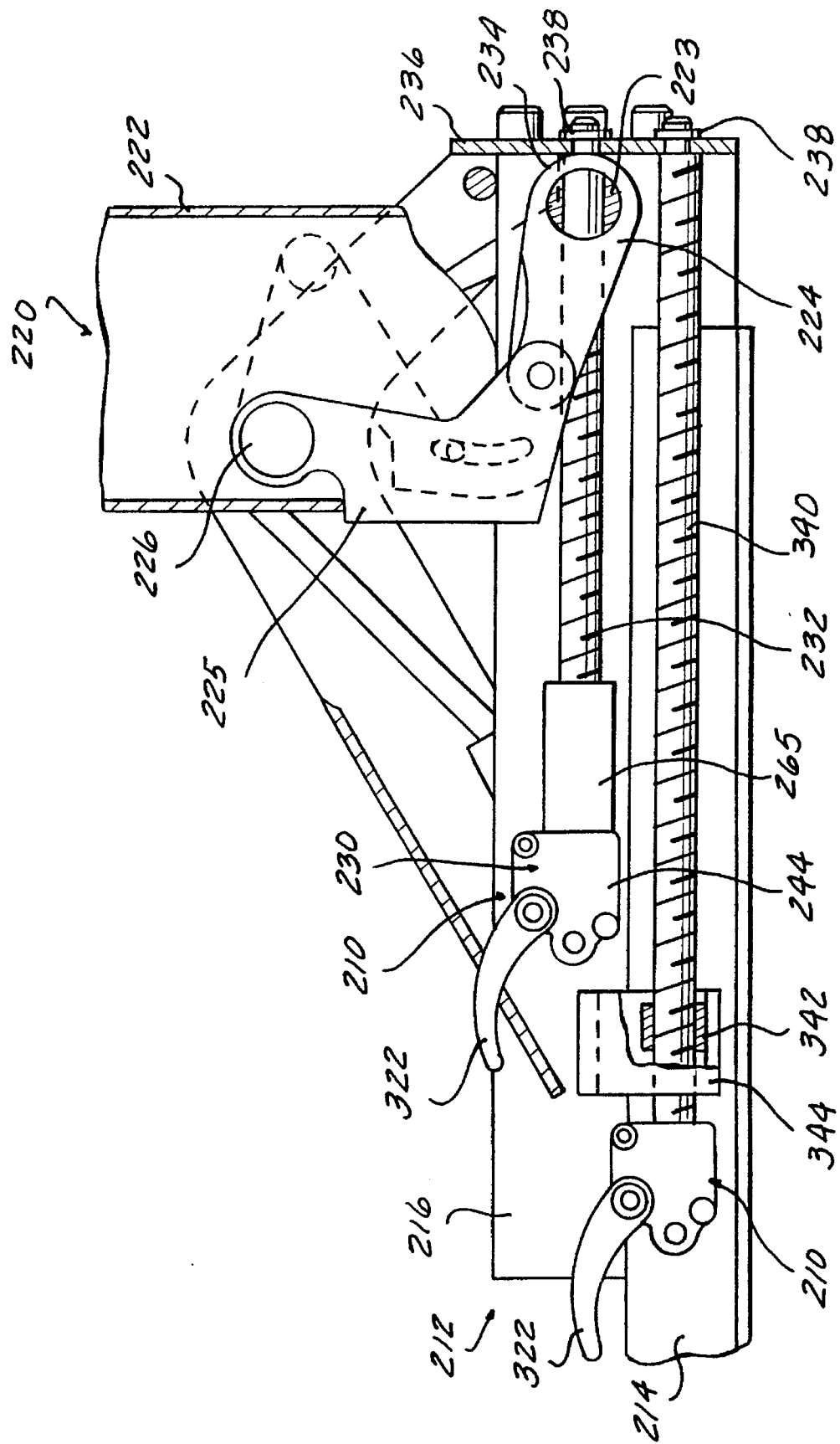
FIG. 10 is a side elevational view of a second embodiment of the linear actuator employed in both a seat recliner and seat adjuster.

Referring now to FIG. 10, there is depicted a second embodiment of a linear actuator 210 constructed in accordance with the teachings of the present invention. In this embodiment, the linear actuator 210 is employed as a seat recliner. A substantially identical linear actuator 210, shown in FIG. 10, is employed as a seat adjuster, as will be described in greater detail hereafter.

As shown in FIG. 10, a vehicle seat includes a track assembly 212, which is one of two identical track assemblies. Each track assembly 212 includes a lower track 214 which is fixedly mounted to a vehicle floor. An upper track 216 is slidably mounted within the lower track 214 and is horizontally movable fore and aft with respect to the lower track 214.

A seat back 220 including a seat back frame 222 is pivotally connected to the upper track 216. A travelling nut 223 having an internally threaded bore is mounted at one end of a link 224. The other end of the link is pivotally connected to a link control bracket 225. The other end of the link control bracket 225 is pivotally connected by means of a suitable pivot pin 226 to the seat back frame 222. Further details concerning the operation of the seat back recliner may be had by referring to U.S. Pat. No. 5,306,073, assigned to the Assignee of the present invention, the contents of which, with respect to the seat back recliner mechanism, are incorporated herein in their entirety.

The linear actuator 210 for the seat recliner includes a metallic housing 230 which is disposed about a rotatable shaft 232. The rotatable shaft 232 preferably comprises a rotatable, externally threaded drive shaft which is disposed within a channel portion of the upper track 216. A step 234 is formed at one end of the shaft 232 and abuts a thrust surface 236 mounted at one end of the upper track 216. A narrow end portion of the shaft 232 projects from the step 234 and extends through a bore in the thrust surface 236 and is rotatably retained in position by means of a C-clip 238 or other suitable fastener to restrain the shaft 232 from leftward movement in the orientation shown in FIG. 10.

Figure 11:
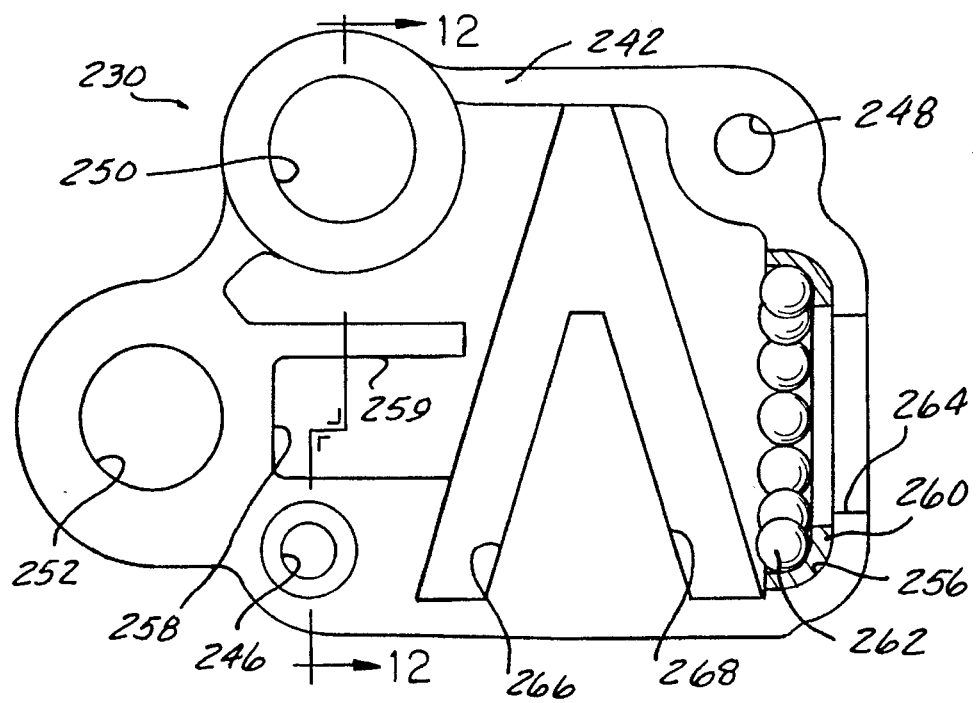
FIG. 11 is a side elevational view of one housing part of the linear actuator shown in FIG. 10.
Figure 12:
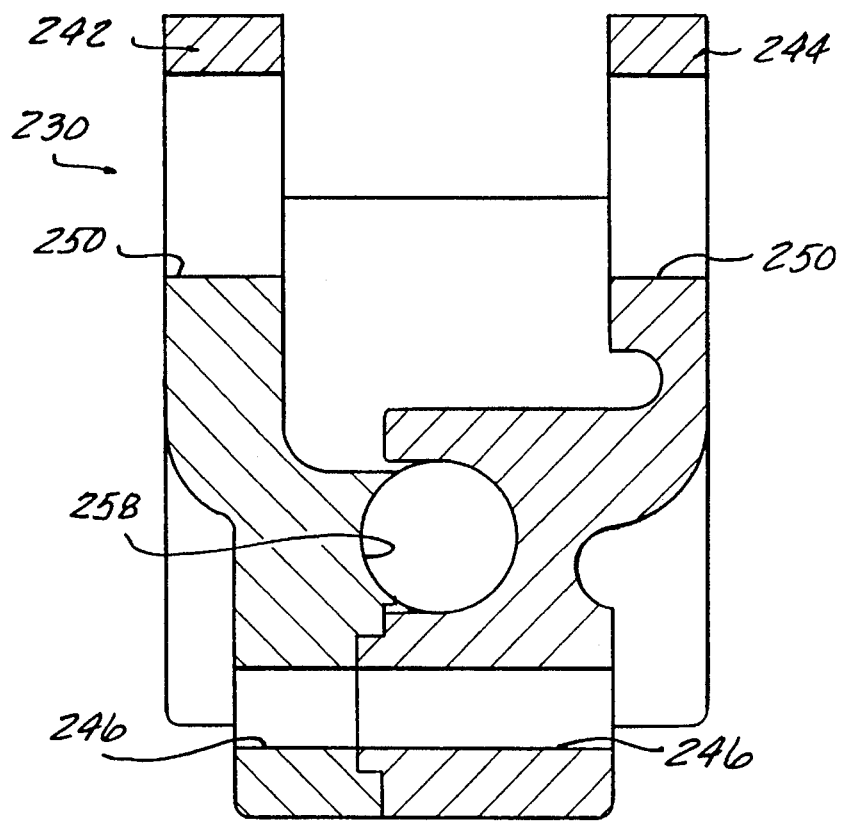
FIG. 12 is a cross sectional view generally taken along life 12—12 in FIG. 11 and showing an assembled housing.
Figure 16:
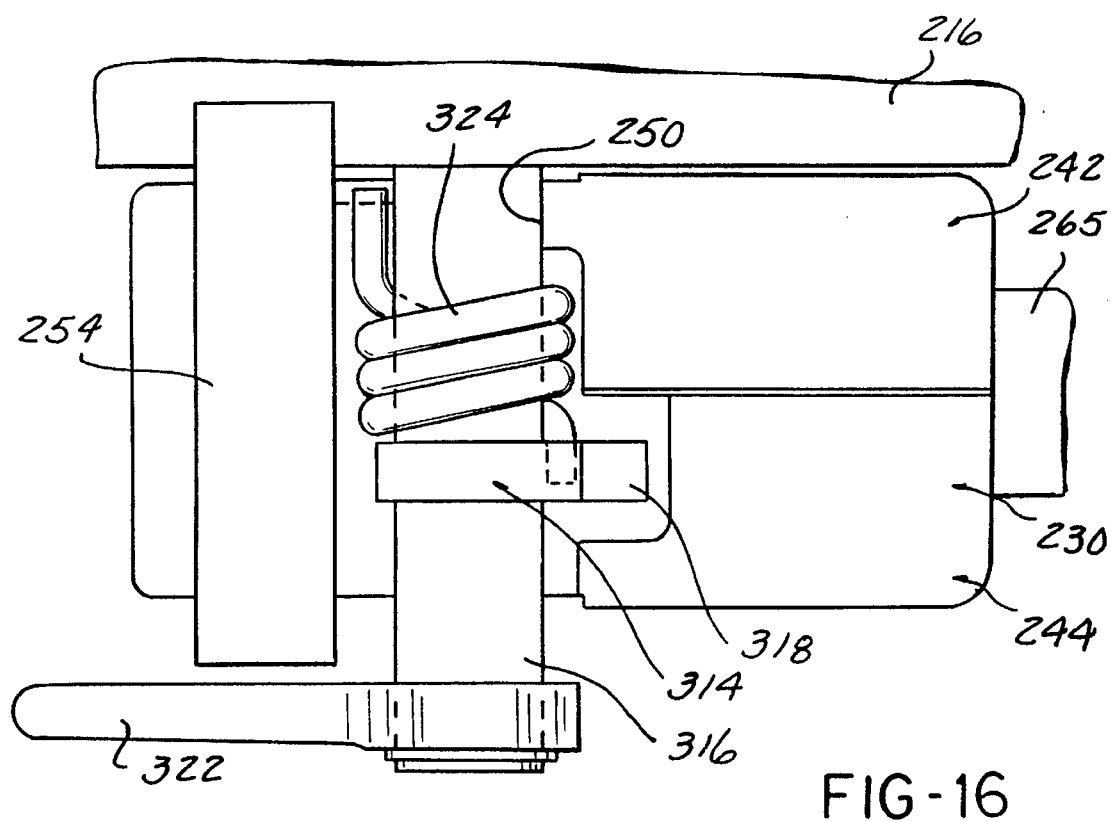
FIG. 16 is a plan view of the linear actuator, with a portion of the top of the housing removed.

As shown in detail in FIGS. 11, 12 and 16, the housing 230 is formed of two mating, interconnected housing sections or parts 242 and 244. Mating bores 246 and are formed in each of the housing parts 242 and 244, as shown in FIGS. 11 and 12, and receive suitable fasteners, not shown, to fixedly join the two housing parts 242 and 244 together into a fixed, complete housing 230.

An enlarged bore 250 is also formed in each housing part 242 and 244. The bores 250 are co-axially aligned as shown in FIGS. 12 and 16, to receive a rotatable drive pin, described hereafter.

An additional bore 252 is also formed in each housing part 242 and 244. The bores 252 are also co-axially aligned for receiving an elongated mounting pin 254, shown in FIG. 16, which extends into the upper track 216 to fixedly mounted the housing 230 to the upper track 216. A suitable retainer clip or fastener, not shown, is employed to retain the housing 230 on the mounting pin 254.

As shown in FIG. 11, a first bearing means in the form of a seat 256 is formed at one end of the housing 230. Complimentarily-shaped portions of the seat 256 are formed in each of the housing parts 242 and 244. An opposed second bearing means or seat 258 is also formed at an end of a bore 259 in the housing 230 spaced from and axially aligned with the first bearing seat 256. By way of example only, the first bearing seat 256 has a generally annular shape as shown in FIG. 11. The second bearing seat 258 is in the form or a low friction surface which serves as a bearing without the need for a separate bearing race 260 and ball bearings 262 which are depicted as being mounted in the first bearing seat 256.

The bearings 262 and the bearing seat or surface 258 shown in FIG. 11 are depicted by way of example only. It will be understood that identical bearing seats 256, races 260 and bearings 262 may be disposed at both opposite ends of the housing 230. Alternately, the low friction bearing surface 258 may be formed at both opposite ends of the housing 230.

The housing also includes an end bore 264 formed at one end of the housing 230 which receives the rotatable shaft 232. An elongated, tubular sleeve 265, shown in FIGS. 10 and 16, surrounds the rotatable shaft 232 and extends longitudinally outward from the bore 264.

A pair of inversely angled guide slots 266 and 268, described in greater detail hereafter, are formed in each housing part 242 and 244. The guide slots 266 and 268 extend at a predetermined angle, such as 18°, from normal to the longitudinal axis of the housing 230.

Figure 14:
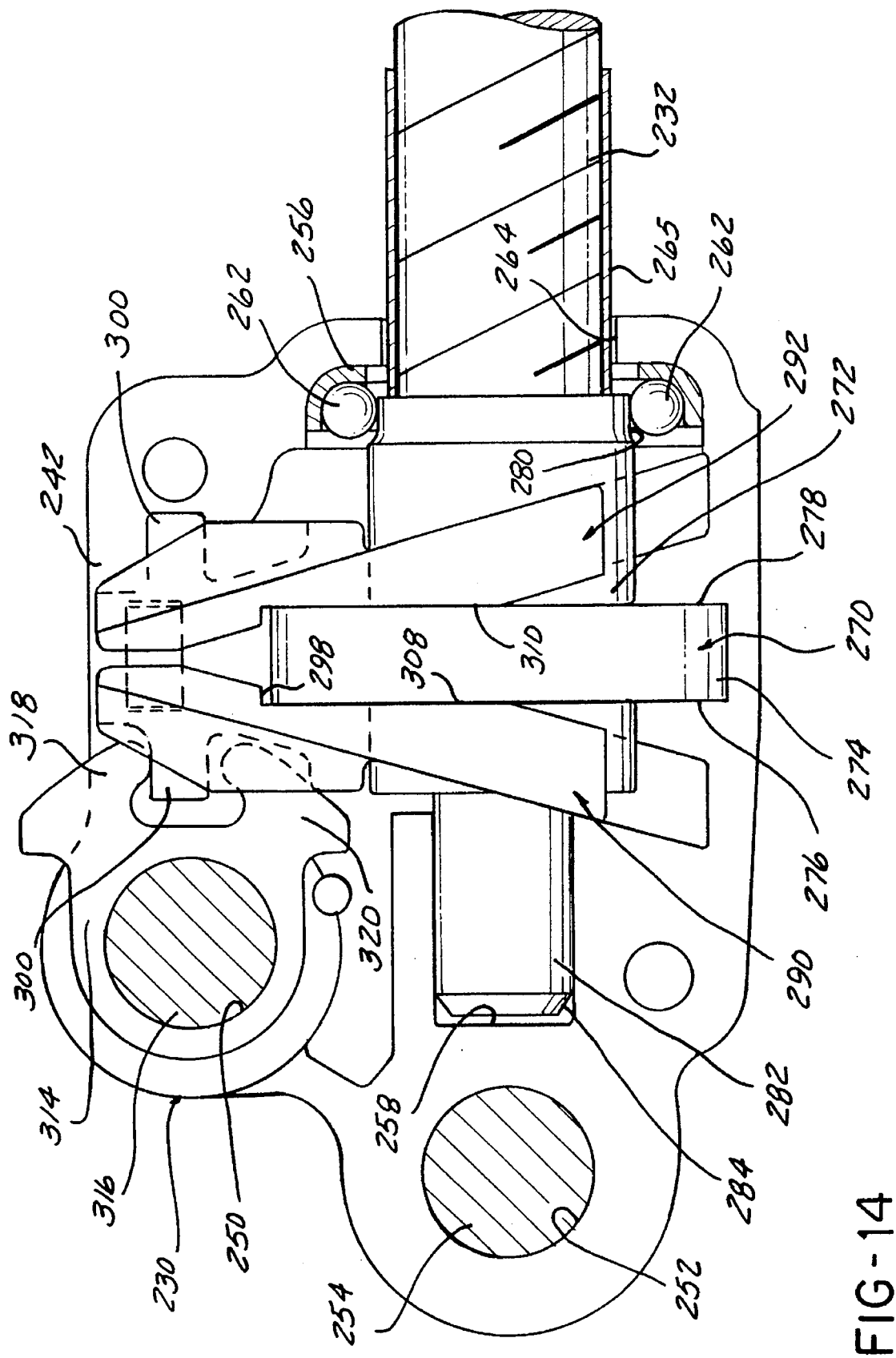
FIG. 14 is a partial, longitudinal cross sectional view showing the locked position of the components of the second embodiment of the linear actuator.
Figure 15:
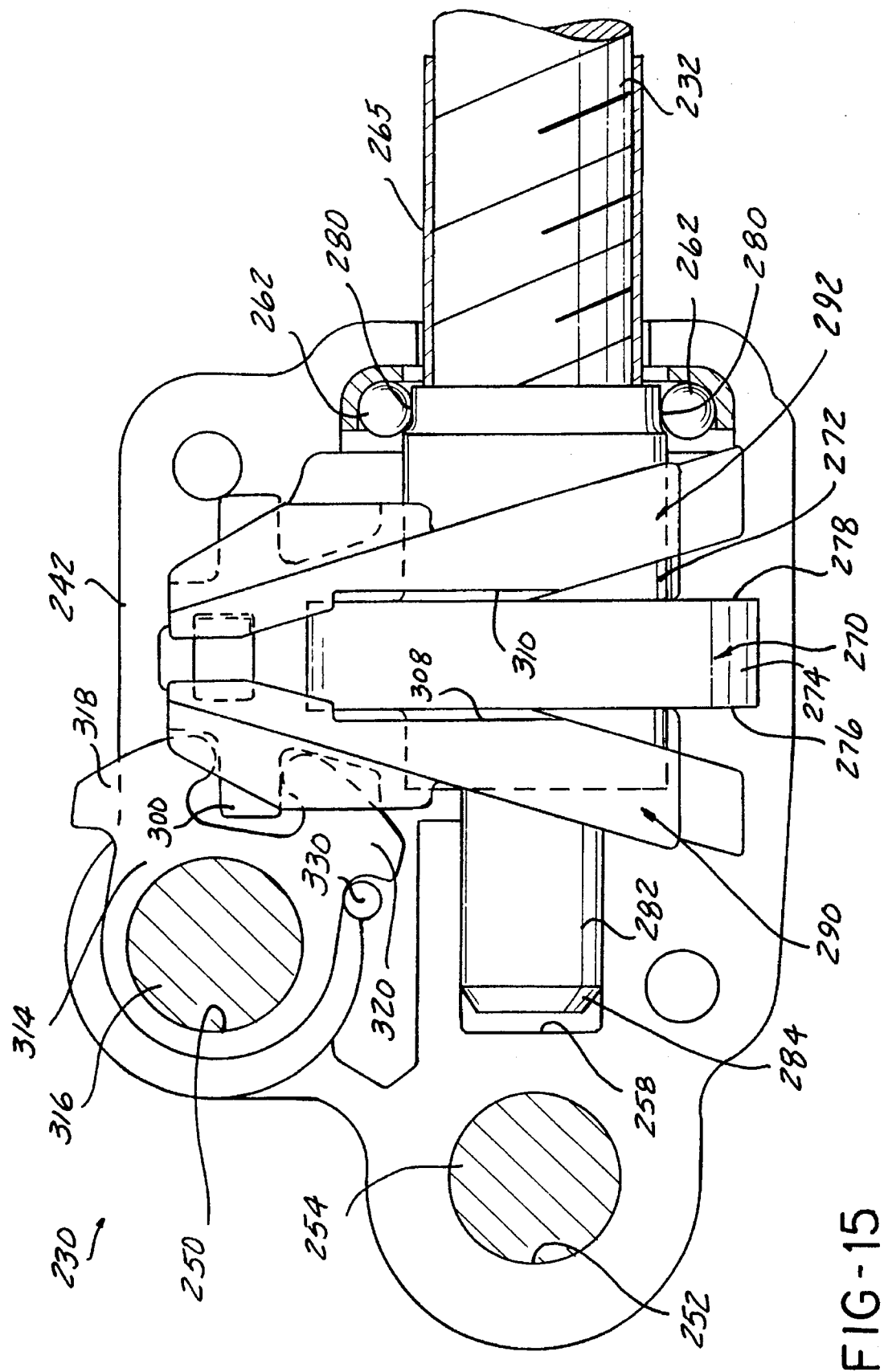
FIG. 15 is a partial longitudinal cross sectional view showing the components of the second embodiment of the linear actuator in an unlocked position.

As shown in FIGS. 14 and 15, a rotatable element 270 preferably formed of a metallic material is fixedly coupled or mounted on the rotatable shaft 232, preferably at one end of the shaft 232. The rotatable element 270 is fixedly mounted on the shaft 232 by suitable means, such as by molding or otherwise forming the rotatable element 270 on the shaft 232 or by coupling a separate rotatable element 270 to the shaft 232 by means of suitable fasteners. In this manner, the rotatable element 270 rotates with the rotatable shaft 232. The rotatable element 270 is in the form of a tubular member having a generally circular cross section portion 272 and an enlarged, annular collar 274 formed intermediately on the circular portion 272. The collar 274 has a diameter larger than that of the circular portion 272 and extends radially outward from the outer periphery of the circular portion 272. Opposed side surfaces 276 and 278 are formed on the collar 274.

A first bearing seat 280 is formed at one end of the rotatable element 270 and engages the bearings 262 as described hereafter. The other end of the rotatable element 270 is formed as a step-down, longitudinally extending tubular end 282 which terminates in a second bearing surface 284. The bearing surface 284 is adapted to abut the bearing surface 258 in the housing 230 as described hereafter.

Figure 13:
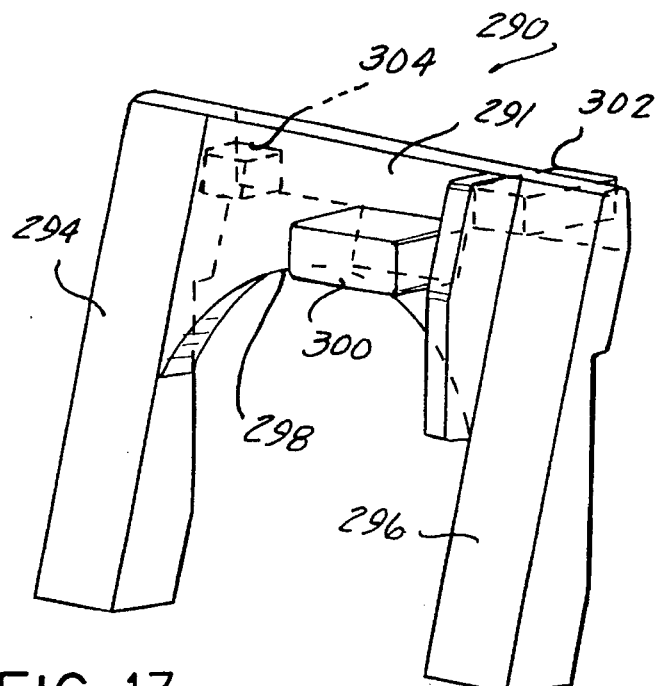
FIG. 13 is a perspective view of one of the two identical moving members.

FIG. 13 depicts one of first and second moving members or lock plates 290 and 292, both of which are also shown in FIGS. 14 and 15. As the moving members 290 and 292 are preferably identically constructed, and merely arranged in an opposed manner, the following description with respect to moving member 290 will also be understood to apply equally to moving member 292.

The moving member 290 is formed of a strong, lightweight material such as aluminum. As shown in FIGS. 13 and 14, the moving member 290 has a U-shape formed of a top central leg 291 and opposed ramp surfaces 294 and 296 which are disposed at a predetermined angle, such as 18° from a normal plane through the moving member 290. An arcuate surface 298 extends between the ramp surfaces 294 and 296 at the lower edge of the top central leg 291 and is disposed about the periphery of the annular collar 274 on the rotatable element 270 as shown in FIG. 14.

A first projection 300 extends from one side of the top center portion 291 of the moving member 290. A second projection 302 extends from the opposite side of the top central leg 291. An inward-extending aperture 304 is also formed in the opposite side of the top central leg 291 of the moving member 290 and is aligned with the second projection 302.

When the moving members 290 and 292 are arranged in a reversed manner within the housing 230, as shown in FIG. 14, the first projection 300 on the moving member 290 extends outward from the mated pair of moving members 290 and 292. The second projection 302 in the moving member 290 slidably engages the aperture 304 in the moving member 292. Likewise, the second projection 302 on the moving member 292 slidably engages the aperture 304 in the first moving member 290. The interconnected projections 302 and apertures 304 in the moving members 290 and 292 interconnect the moving members 290 and 292 for simultaneous movement; while maintaining the first and second moving members 290 and 292 in alignment as the moving members 290 and 292 move toward and away from each other as described hereafter.

An engaging surface 308 is formed on one side of each ramp surface 294 and 296 of the moving member 290 and a similar engaging surface 310 is formed on one side of the moving member 292. When the moving members 290 and 292 are interconnected as shown in FIG. 14, the engaging surfaces 308 and 310 oppose each other. In use, the engaging surface 308 and 310 are moved into engagement with the side surfaces 276 and 278, respectively, on the annular collar 274 on the rotatable element 270.

It should also be noted that in the mounting position shown in FIG. 14, the ramp surfaces 294 and 296 of each of the moving members 290 and 292 slidably engage the guide slots 266 and 268 formed in each housing part 242 and 244. In this manner, the guide slots 266 and 268 guide the sliding movement of the moving members 290 and 292 between first and second positions, as described hereafter.

As shown in FIGS. 14 and 15, a drive member denoted generally by reference number 314 is fixedly mounted on a drive pin 316 which rotatably extends through the aligned bores 250 in the joined housing parts 242 and 244. The drive member 314 includes a pair of spaced drive fingers 318 and 320 which are spaced apart a distance to engage opposite sides of the projection 300 on the first moving member 290 as shown in FIG. 14.

A lever 322, shown in FIGS. 10 and 16, is fixedly joined at one end to the drive pin 316. In this manner, movement of the lever 322 from a first, normal position shown in FIGS. 10 and 16 to a second, pivoted position, results in rotation of the drive pin 316 and the drive member 314 and a resulting lateral movement of the projection 300 on the first moving member 290, and the second moving member 292 interconnected to the first moving member 290, depending upon the direction of rotation of the lever 322, the drive pin 316 and the drive member 314.

The operation of the second embodiment of the linear actuator 210 of the present invention will now be described with reference to FIG. 14 which depicts the position of the components of the linear actuator 210 in a normal, first, locked position. In this position, the linear actuator 210 holds the rotatable shaft 232 in a locked, non-rotatable position.

Referring briefly to FIG. 16, a biasing spring 324 is connected at one end to the housing part 242 and at another end to the drive member 314 for normally biasing the drive member 314 to the first normal position shown in FIG. 10.

As the biasing spring 324 pivots the drive member 314 to the first, normal, locked position, the drive finger 320 engages the projection 300 on the first moving member 290 and slides the first moving member 290, as well as the second moving member 292 joined thereto upward, in the orientation shown in FIG. 14, to the first locked position in which the engaging surfaces 308 and 310 on the first and second moving members 290 and 292, respectively, engage the side surfaces 276 and 278 of the annular collar 274 on the rotatable element 270. During such engagement, the moving members 290 and 292 center the annular collar 274 of the rotatable element 270 therebetween and cause the rotatable element 270 and the shaft 232 fixedly connected thereto to axially move a short distance, such as 0.02 inches, thereby disengaging the bearing surfaces 280 and 284 on the rotatable element 270 from each of the bearing means 262 and 258 in the housing 230. This movement disengages the rotatable element 270 from a low frictional engagement with one of the bearing means 258 or 262 and moves the rotatable element 270 in a high rotational resistance in position to prevent any rotation of the shaft 232 despite axial load forces which may be imposed on the shaft 232. In this manner, the seat back 220 is prevented from pivotal movement with respect to the seat track assembly 212.

When it is desired to adjust the angular position of the seat back 220 with respect to the seat track assembly 212, the release lever 322 is pivoted clockwise in the orientation shown in FIG. 15 to the second unlocked position until it engages a stop 330. This pivotal movement of the release lever 322 causes rotation of the drive member 314, as shown in FIG. 15, to a second position. During such rotation, the drive finger 318 engages the projection 300 on the first moving member 290 and urges the first moving member 290 as well as the interconnected second moving member 292 downward within the guide slots 266 and 268 in the housing 230 to the second unlocked position shown in FIG. 15. During such sliding movement of the first and second moving members 290 and 292, the engaging surfaces 308 and 310 on the first and second moving members 290 and 292, respectively, disengage from the side surfaces 276 and 278 on the rotatable element 270. This disengagement of the moving members 290 and 292 from the rotatable element 270 enables the rotatable element 270 as well as the shaft 232 connected therewith to move axially a short distance, such as 0.02 inches, under any axial load imposed on the shaft 232, such as a load resulting from pivotal movement of the seat back 220 in either direction about its pivot connection to the seat track assembly 212. Such axial movement of the shaft 232 and the rotatable element 270 fixedly mounted thereon brings one of the bearing surfaces 280 or 284 on the rotatable element 270 into a low frictional engagement with the corresponding bearing means 262 or 258 in the housing 230, depending upon the direction of axial movement of the shaft 232. This engagement with one of the bearing means 262 or 258 provides a low rotation resistance which enables the rotatable element 270 and the shaft 232 to freely rotate under the axial loading forces applied to the rotatable shaft 232. The resulting rotation of the shaft 232 causes translation of the drive nut 223 along the shaft 232 and results in pivotal movement of the seat back recliner 220 through the interconnected link 224 and link control bracket 225, as described above. When the seat back recliner 220 is in the desired angular position, the user releases the release lever 322, which, as described above, results in movement of the first and second moving members 290 and 292 back to the first locked position shown in FIG. 14 to lock the seat back 220 in the desired angular position.

Referring again to FIG. 10, there is depicted the use of the linear actuator 210 of the present invention in a seat adjuster application. In this application, the linear actuator 210 includes a rotatable element 270 which is fixedly coupled to one end of a rotatable shaft 340. The other end of the rotatable shaft 340 bears against the thrust surface 236 mounted at one end of the upper track 216 and is fixedly, yet rotatably mounted with respect to the thrust surface 236 by means of suitable fasteners, such as a C-clip 238.

A drive nut 342 is threadingly engaged with the shaft 340. The drive nut 342 is rotatably mounted in a suitable bracket 344 which is fixedly connected to the upper track 216. In this manner, rotation of the shaft 340, in the same manner as described above for the shaft 232, causes rotation of the drive nut 342 and translation of the drive nut 342 and the upper track 216 of the vehicle seat track assembly 212 with respect to the lower track 214 to adjust the position of the upper track 216 with respect to the lower track 214. It should be noted that such translation of the upper track 216 with respect to the lower track 214 is bidirectional depending upon the direction of axial load forces imposed on the upper track 216.

The unique construction of the second embodiment of the linear actuator 10 provides significant advantages in the construction of vehicle seat assemblies since the lower and upper tracks 214 and 216 of such vehicle seat assemblies 212 may be formed identically regardless of whether the seat assembly utilizes a power driven seat adjuster or seat recliner as well as a manually operated seat adjuster or seat recliner with a linear actuator of the present invention. This provides commonality of components over various vehicle seat assembly constructions to reduce overall manufacturing costs.

In summary, there has been disclosed a unique infinitely adjustable linear actuator which is ideally suited for use in vehicle seats as a seat recliner actuator or as a seat adjuster actuator. The linear actuator of the present invention is simply constructed and has a small compact size and a light weight. Further, the linear actuator provides a reliable, smooth, low force release; but still, when in the engaged position, prevents any chucking or movement of the movable component of the seat with respect to a fixed component of the seat, such as between the seat back and the seat bottom. The linear actuator of the present invention may also be employed as a horizontally mounted seat recliner, a vertically mounted seat recliner or as a horizontal, fore and aft seat position adjuster.

What is claimed is:

1. A linear actuator for a vehicle seat including a track assembly formed of a lower track fixedly mounted to a vehicle, an upper track movably mounted in the lower track for translation with respect to the lower track, and a seat back frame member mounted to one of the upper track and the lower track, the linear actuator comprising:

a rotatable shaft adapted to be coupled to one of the upper track, the lower track and the seat back frame member;

a housing mounted about the rotatable shaft and fixedly coupled to another of the upper track, the lower track and the seat back frame member;

a rotatable element disposed within the housing about and fixedly coupled to and rotatable with the rotatable shaft;

first and second bearing means, mounted at opposite ends of the housing, for providing bearing surfaces for the rotatable element, the first and second bearing means spaced apart to permit axial movement of the rotatable element therebetween into rotatable engagement with one of the first and second bearing means under axial loads on the rotatable shaft permitting rotation of the rotatable shaft; and means, mounted in the housing, for displacing the rotatable element from engagement with the first and second bearing means to a non-rotatable position disengaged from both of the first and second bearing means and inhibiting rotation of the rotatable shaft.

2. The linear actuator of claim 1 wherein the displacing means comprises:

first and second moving members disposed in the housing, each movable from a first engaged position with the rotatable element in which the first and second moving members disengage the rotatable element from both of the first and second bearing means and a second disengaged position with respect to the rotatable element; and means, mounted in the housing and coupled to the first and second moving members, for moving the first and second moving members between the first and second positions.

3. The linear actuator of claim 2 wherein the moving means comprises:

bidirectional rotatable drive means, mounted in the housing and connected to first and second moving members, for driving the first and second moving members between first and second positions.

4. The linear actuator of claim 3 wherein moving means further comprises:

guide means, formed on first and second moving members and the housing, for guiding movement of first and second moving means between first and second positions.

5. The linear actuator of claim 4 wherein the guide means comprises:

a pair of guide slots formed in opposite sides of the housing, the guide slots disposed at a non-perpendicular angle with respect to a longitudinal axis of the housing; and ramp surfaces formed on opposite sides of each of the first and second moving members, each ramp surface slidably engaging one of the guide slots for guiding the first and second moving members toward and away from the rotatable element.

6. The linear actuator of claim 3 further comprising:

biasing means, acting on the drive means, for biasing the drive means to a position driving the first and second moving members to the first engaged position with the rotatable element.

7. The linear actuator of claim 2 wherein the rotatable element comprises:

a body fixedly mounted on and rotatable with the rotatable shaft; and a radially enlarged collar formed between opposite ends of the body, first and second opposed side surfaces formed on the collar.

8. The linear actuator of claim 6 wherein:

the first and second moving members are disposed adjacent the first and second side surfaces of the collar, respectively; and the first and second moving members each including an engaging surface engageable with one of the first and second side surfaces of the collar when the first and second moving members are disposed in a first position.

9. The linear actuator of claim 2 further comprising:

means for interconnecting the first and second moving members for simultaneous movement of the first and second moving members by the moving means.

10. The linear actuator of claim 9 wherein the interconnecting means comprises:

a first projection formed on and extending outward from each of the first and second moving members;

an aperture formed in each of the first and second moving members; and the first and second moving members being disposed in a reversed relationship within the housing such that the first projection on each of the first and second moving members slidably engages the first aperture in the other of the first and second moving members.

11. The linear actuator of claim 10 wherein the moving means comprises:

a drive member rotatably mounted in the housing;

a release lever fixedly coupled to the drive member for bidirectionally rotating the drive member upon bidirectional pivotal movement of the release lever; and a second projection extending outward from at least one of the first and second moving members; and drive finger means, mounted on the drive member and engaging the second projection, for moving the interconnected first and second moving members between first and second positions during bidirectional rotation of the drive member.

12. The linear actuator of claim 1 wherein:

the rotatable shaft is an externally threaded shaft;

the linear actuator further including:

a drive nut having an internally threaded bore engaged with the rotatable shaft, the drive nut translating along the rotatable shaft as the rotatable shaft rotates; and a linkage connected to the seat back frame member and the drive nut for pivoting the seat back frame member during translation of the drive nut along the rotatable shaft.

13. The linear actuator of claim 1 wherein the first and second bearing means comprise at least one of a plurality of bearings mounted in a bearing seat formed in the housing and a low friction bearing surface formed in the housing.

14. The linear actuator of claim 1 wherein:

the housing is adapted to be mounted to the upper track of a vehicle seat; and one end of the rotatable shaft adapted to be rotatably connected to the upper track of the vehicle seat.

15. The linear actuator of claim 1 wherein:

the rotatable shaft is adapted to be rotatably mounted on the lower track of a vehicle seat;

a threaded drive nut is threadingly mounted about the rotatable shaft; and a bracket rotatably carrying the drive nut is adapted to be fixedly connected the upper track of a vehicle seat such that rotation of the rotatable shaft causes translation of the drive nut along the rotatable shaft and translation of the upper track relative to the lower track.

16. The linear actuator of claim 1 further comprising:

biasing means for biasing the displacing means to a position in which the displacing means displaces the rotatable element from engagement with the first and second bearing means.

17. A linear actuator for a vehicle seat including a track assembly formed of a lower track fixedly mounted to a vehicle, an upper track movably mounted in the lower track for translation with respect to the lower track, and a seat back frame member mounted to one of the upper track and the lower track, the linear actuator comprising:

a rotatable shaft having a plurality of external threads formed thereon, the rotatable shaft adapted to be coupled to one of the upper track, the lower track and the seat back frame member;

a rotatable element fixedly coupled to and rotatable with the shaft;

an enlarged annular collar formed on the rotatable element, the annular collar having opposed side surfaces extending radially outward from an exterior surface of the rotatable element;

a housing having opposed ends, the rotatable element mounted in the housing, the housing adapted to be fixedly coupled to another of the upper track, the lower track and the seat back frame member;

first and second bearing means, mounted at the opposite ends of the housing, respectively, for providing first and second low resistance bearing surfaces for the rotatable element;

first and second moving members disposed in the housing, each of the first and second moving members disposed adjacent to one of the opposed side surfaces of the annular collar on the rotatable element; and means, mounted on the housing, for moving the first and second moving members between a first position in which the first and second moving members engage the opposed side surfaces of the annular collar and disengage the rotatable element from both of the first and second bearing means and form a high friction connection with the rotatable element preventing rotation of the rotatable element and the rotatable shaft, and a second position in which the first and second moving members are spaced from the annular collar to permit axial movement of the rotatable element into engagement with one of the first and second bearing means under an axial load acting in one direction on the threaded shaft and thereby rotation of the rotatable element and the rotatable shaft.

18. The linear actuator of claim 17 wherein the moving means comprises:

bidirectional rotatable drive means, mounted in the housing and connected to first and second moving members, for driving the first and second moving members between the first and second positions.

19. The linear actuator of claim 18 wherein moving means further comprises:

guide means, formed on first and second moving members and the housing, for guiding movement of first and second moving means between the first and second positions.

20. The linear actuator of claim 19 wherein the guide means comprises:

a pair of guide slots formed in opposite sides of the housing, the guide slots disposed at a non-perpendicular angle with respect to a longitudinal axis of the housing; and ramp surfaces formed on opposite sides of each of the first and second moving members, each ramp surface slidably engaging one of the guide slots for guiding the first and second moving members toward and away from the rotatable element.

21. The linear actuator of claim 18 further comprising:

biasing means, acting on the drive means, for biasing the drive means to a position driving the first and second moving members to the first engaged position with the rotatable element.

22. The linear actuator of claim 17 wherein:

the first and second moving members each have an engaging surface engageable with one of the first and second side surfaces of the collar when the first and second moving members are disposed in a first position.

23. The linear actuator of claim 17 further comprising:

a drive nut having an internally threaded bore engaged with the rotatable shaft, the drive nut translating along the rotatable shaft as the rotatable shaft rotates; and a linkage adapted to be connected to the seat back frame member and the drive nut for pivoting the seat back frame member during translation of the drive nut along the rotatable shaft.

24. The linear actuator of claim 17 further comprising:

means for interconnecting the first and second moving members for simultaneous movement of the first and second moving members by the moving means.

25. The linear actuator of claim 24 wherein the interconnecting means comprises:

a first projection formed on and extending outward from each of the first and second moving members;

an aperture formed in each of the first and second moving members; and the first and second moving members being disposed in a reversed relationship within the housing such that the first projection on each of the first and second moving members slidably engages the first aperture in the other of the first and second moving members.

26. The linear actuator of claim 25 wherein the moving means comprises:

a drive member rotatably mounted in the housing;

a release lever fixedly coupled to the drive member for bidirectionally rotating the drive member upon bidirectional pivotal movement of the release lever; and a second projection extending outward from at least one of the first and second moving members; and drive finger means, mounted on the drive member and engaging the second projection, for moving the interconnected first and second moving members between first and second positions during bidirectional rotation of the drive member.

27. The linear actuator of claim 17 wherein the first and second bearing means comprise at least one of a plurality of bearings mounted in a bearing seat formed in the housing and a low friction bearing surface formed in the housing.

28. The linear actuator of claim 17 wherein:

the rotatable shaft is adapted to be rotatably mounted on the lower track of a vehicle seat;

a threaded drive nut is threadingly mounted about the rotatable shaft; and a bracket rotatably carrying the drive nut and adapted to be fixedly connected the upper track of a vehicle seat such that rotation of the rotatable shaft causes translation of the drive nut along the rotatable shaft and translation of the upper track relative to the lower track.

29. The linear actuator of claim 17 further comprising:

biasing means for biasing the moving means to a position in which the moving means moves the first and second moving members to the first position engaging the annular collar on the rotatable element.

30. A linear actuator for adjusting and immobilizing a movable part relative to a support, the linear actuator comprising:

a rotatable shaft adapted to be coupled to the movable part;

a housing adapted to be connected to the support and mounted about the rotatable shaft;

a rotatable element disposed within the housing about and fixedly coupled to and rotatable with the rotatable shaft;

first and second bearing means, mounted at opposite ends of the housing, for providing bearing surfaces for the rotatable element, the first and second bearing means spaced apart to permit axial movement of the rotatable element therebetween into rotatable engagement with one of the first and second bearing means under axial loads on the rotatable shaft permitting rotation of the rotatable shaft; and means, mounted in the housing, for displacing the rotatable element from engagement with the first and second bearing means to a non-rotatable position preventing rotation of the rotatable shaft.

31. The linear actuator of claim 30 wherein the displacing means comprises:

first and second moving members disposed in the housing, each movable from a first engaged position with the rotatable element in which the first and second moving members disengage the rotatable element from both of the first and second bearing means and a second disengaged position with respect to the rotatable element; and means, mounted in the housing and coupled to the first and second moving members, for moving the first and second moving members between the first and second positions.

32. The linear actuator of claim 31 wherein the moving means comprises:

bidirectional rotatable drive means, mounted in the housing and connected to first and second moving members, for driving the first and second moving members between first and second positions.

33. The linear actuator of claim 32 wherein moving means further comprises:

guide means, formed on first and second moving members and the housing, for guiding movement of first and second moving means between first and second positions.

34. The linear actuator of claim 32 further comprising:

biasing means, acting on the drive means, for biasing the drive means to a position driving the first and second moving members to the first engaged position with the rotatable element.

35. The linear actuator of claim 31 wherein the rotatable element comprises:

a body fixedly mounted on and rotatable with the rotatable shaft; and a radially enlarged collar formed between opposite ends of the body, first and second opposed side surfaces formed on the collar.

36. The linear actuator of claim 35 wherein:

the first and second moving members are disposed adjacent the first and second side surfaces of the collar, respectively; and the first and second moving members each including an engaging surface engageable with one of the first and second side surfaces of the collar when the first and second moving members are disposed in a first position.

37. The linear actuator of claim 31 further comprising:

means for interconnecting the first and second moving members for simultaneous movement of the first and second moving members by the moving means.

38. The linear actuator of claim 37 wherein the moving means comprises:

a drive member rotatably mounted in the housing;

a release lever fixedly coupled to the drive member for bidirectionally rotating the drive member upon bidirectional pivotal movement of the release lever; and a projection extending outward from at least one of the first and second moving members; and drive finger means, mounted on the drive member and engaging the projection, for moving the interconnected first and second moving members between first and second positions during bidirectional rotation of the drive member.

39. The linear actuator of claim 30 wherein the first and second bearing means comprise at least one of a plurality of bearings mounted in a bearing seat formed in the housing and a low friction bearing surface formed in the housing.

40. The linear actuator of claim 30 further comprising:

biasing means for biasing the displacing means to a position in which the displacing means displaces the rotatable element from engagement with the first and second bearing means.

* * * * *